United States Patent
Nishikawa et al.

(10) Patent No.: US 11,789,643 B2
(45) Date of Patent: Oct. 17, 2023

(54) MEMORY SYSTEM AND CONTROL METHOD

(71) Applicant: KIOXIA CORPORATION, Tokyo (JP)

(72) Inventors: Suguru Nishikawa, Tokyo (JP); Toshikatsu Hida, Yokohama Kanagawa (JP); Shunichi Igahara, Fujisawa Kanagawa (JP); Takehiko Amaki, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 44 days.

(21) Appl. No.: 17/685,229

(22) Filed: Mar. 2, 2022

(65) Prior Publication Data

US 2023/0073249 A1 Mar. 9, 2023

(30) Foreign Application Priority Data

Sep. 8, 2021 (JP) .................................. 2021-146258

(51) Int. Cl.
*G06F 3/06* (2006.01)

(52) U.S. Cl.
CPC .......... *G06F 3/0655* (2013.01); *G06F 3/0608* (2013.01); *G06F 3/0619* (2013.01); *G06F 3/0679* (2013.01)

(58) Field of Classification Search
CPC .... G06F 3/0655; G06F 3/0608; G06F 3/0619; G06F 3/0679; G06F 3/065; G06F 11/10
See application file for complete search history.

(56) References Cited

U.S. PATENT DOCUMENTS

| | | | | |
|---|---|---|---|---|
| 5,375,127 A | * | 12/1994 | Leak | G11B 20/1833 |
| | | | | 714/756 |
| 2012/0324310 A1 | * | 12/2012 | Oshida | H03M 13/63 |
| | | | | 714/755 |
| 2013/0139030 A1 | * | 5/2013 | Okubo | G06F 11/1048 |
| | | | | 714/755 |
| 2014/0082456 A1 | * | 3/2014 | Liu | G06F 11/1012 |
| | | | | 714/764 |
| 2015/0349805 A1 | * | 12/2015 | Tsai | H03M 13/2942 |
| | | | | 714/755 |
| 2016/0062829 A1 | * | 3/2016 | Harasawa | H03M 13/2903 |
| | | | | 714/755 |
| 2019/0042146 A1 | | 2/2019 | Wysoczanski et al. | |
| 2020/0065187 A1 | * | 2/2020 | Yeh | G11C 16/10 |

(Continued)

FOREIGN PATENT DOCUMENTS

JP 2020155052 A 9/2020

*Primary Examiner* — Hiep T Nguyen
(74) *Attorney, Agent, or Firm* — Kim & Stewart LLP

(57) ABSTRACT

According to one embodiment, a memory system includes non-volatile memory and volatile memory. A controller encodes a first unit size data portion to be written into the non-volatile memory and generates a first error correction code for the data portion, then writes the data portion into the non-volatile memory. The controller also stores the first error correction code in the volatile memory. When non-volatilization of an error correction code protect the data portion is requested, the controller encodes the data portion to generate a second error correction code for the data portion, and then writes the second error correction code into the non-volatile memory. The second error correction code is smaller in size than the first error correction code.

20 Claims, 24 Drawing Sheets

(56) References Cited

U.S. PATENT DOCUMENTS

2020/0167279 A1    5/2020   Palmer
2020/0301612 A1    9/2020   Jin et al.
2021/0191810 A1*   6/2021   Cho .................... H03M 13/05
2021/0286671 A1*   9/2021   Amaki ................ G06F 11/1004

* cited by examiner

FIG. 2

|  | DATA DENSITY | SPEED(R/W) |
|---|---|---|
| QLC | 16 VALUES (4 PAGES) | SLOW ↕ FAST |
| TLC | 8 VALUES (3 PAGES) | |
| MLC | 4 VALUES (2 PAGES) | |
| SLC | 2 VALUES (1 PAGES) | |

FIG. 3

LOGICAL-TO-PHYSICAL
ADDRESS CONVERSION TABLE — 31

| LOGICAL ADDRESS | PHYSICAL ADDRESS |
|---|---|
| 0 | X |
| 1 | Y |
| 2 | Z |
| ⋮ | ⋮ |

FIG. 4

DATA ADDRESS-INTERMEDIATE ECC
ADDRESS CORRESPONDENCE TABLE — 32

| PHYSICAL ADDRESS OF USER DATA | PHYSICAL ADDRESS OF INTERMEDIATE ECC |
|---|---|
|  |  |
|  |  |
|  |  |
|  |  |

FIG. 5

DATA ADDRESS-SB ECC ADDRESS
CORRESPONDENCE TABLE — 33

| PHYSICAL ADDRESS OF USER DATA | PHYSICAL ADDRESS OF SB ECC |
|---|---|
|  |  |
|  |  |
|  |  |
|  |  |

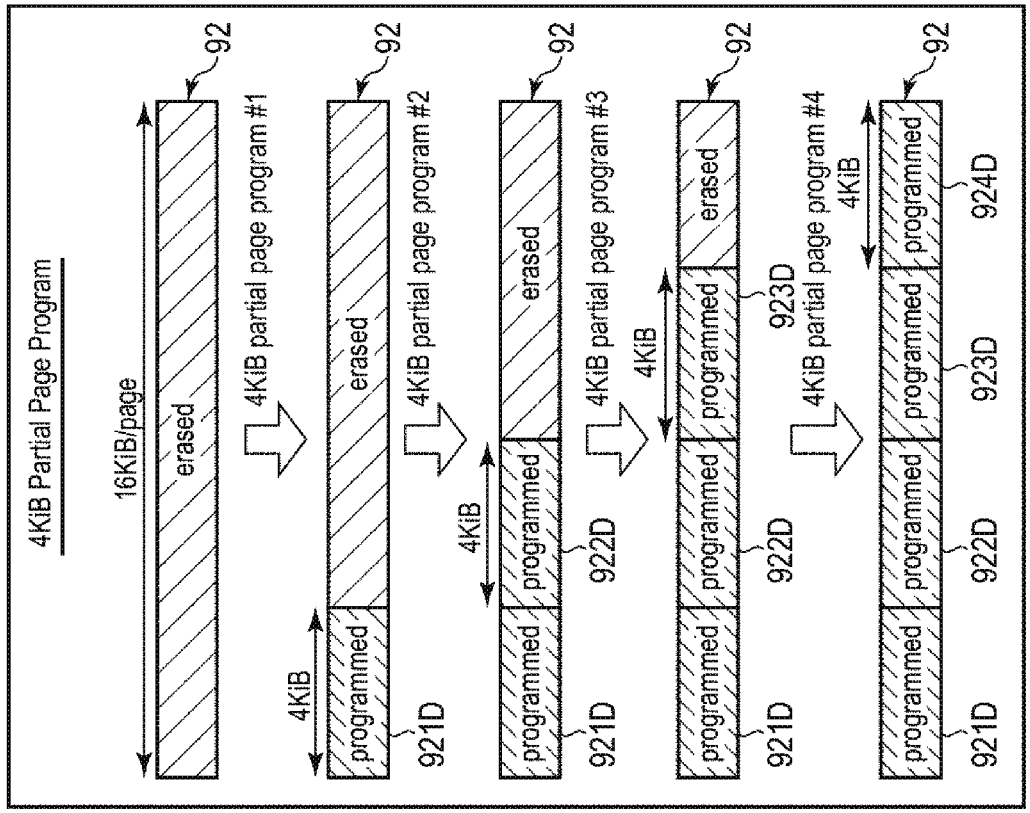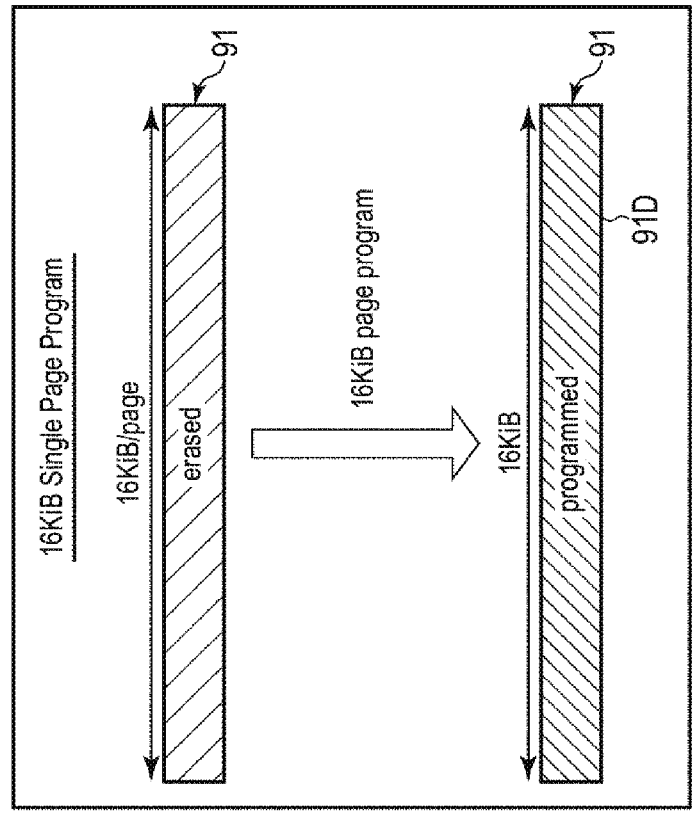

MEMORY SYSTEM AND CONTROL METHOD

CROSS-REFERENCE TO RELATED APPLICATION

This application is based upon and claims the benefit of priority from Japanese Patent Application No. 2021-146258, filed Sep. 8, 2021, the entire contents of which are incorporated herein by reference.

FIELD

Embodiments described herein relate generally to a memory system including a non-volatile memory.

BACKGROUND

In recent years, memory systems equipped with a non-volatile memory have become widespread. As one such memory system, a solid-state drive (SSD) including a NAND flash memory is known. SSDs are used as the main storage device for various computing devices.

A controller in such a memory system may have a function of remedying or compensating for the failure of a storage block in the non-volatile memory. The controller may have an error correction function that corrects erroneous data (misread or unreadable data) by using an error correction code (ECC) function.

In order to increase the amount of user data that can be stored in the non-volatile memory, it is desirable that the ratio of ECC in the data stored in the non-volatile memory be as low as possible. That is, it is desirable to be able to deal with block failures at a lower ECC ratio.

BRIEF DESCRIPTION OF THE DRAWINGS

FIG. 2 is a diagram showing the characteristics of a write mode used in a memory system according to an embodiment.

FIG. 3 is a diagram showing a configuration example of a logical-to-physical address conversion table used in a memory system according to an embodiment.

FIG. 4 is a diagram showing a configuration example of a data address-intermediate ECC address correspondence table used in a memory system according to an embodiment.

FIG. 5 is a diagram showing a configuration example of a data address-save block ECC (SB ECC) address correspondence table used in a memory system according to an embodiment.

FIG. 19A is a diagram showing an example of data written in page units by a Single Page Program function.

FIG. 19B is a diagram showing an example of data written in cluster units by a Partial Page Program function.

DETAILED DESCRIPTION

Embodiments provide a memory system capable of reducing the ratio of ECC in the data stored in a non-volatile memory.

In general, according to one embodiment, a memory system includes a non-volatile memory, a volatile memory; and a controller. The controller controls the non-volatile memory and the volatile memory and is configured to encode a first unit size data portion of the data to be written into the non-volatile memory to generate a first error correction code corresponding to a first error correction code frame with the first unit size data portion. The controller then writes the first unit size data portion into the non-volatile memory but stores the first error correction code in the volatile memory. The controller then subsequently encodes the first unit size data portion to generate a second error correction code corresponding to a second error correction code frame with the first unit size data portion when the non-volatilization of an error correction code corresponding to the first unit size data portion is requested (or otherwise required). The controller then writes the second error correction code into the non-volatile memory. The second error correction code is smaller in size than the first error correction code.

Hereinafter, certain example embodiments of the present disclosure will be described with reference to the drawings.

Figure 1:
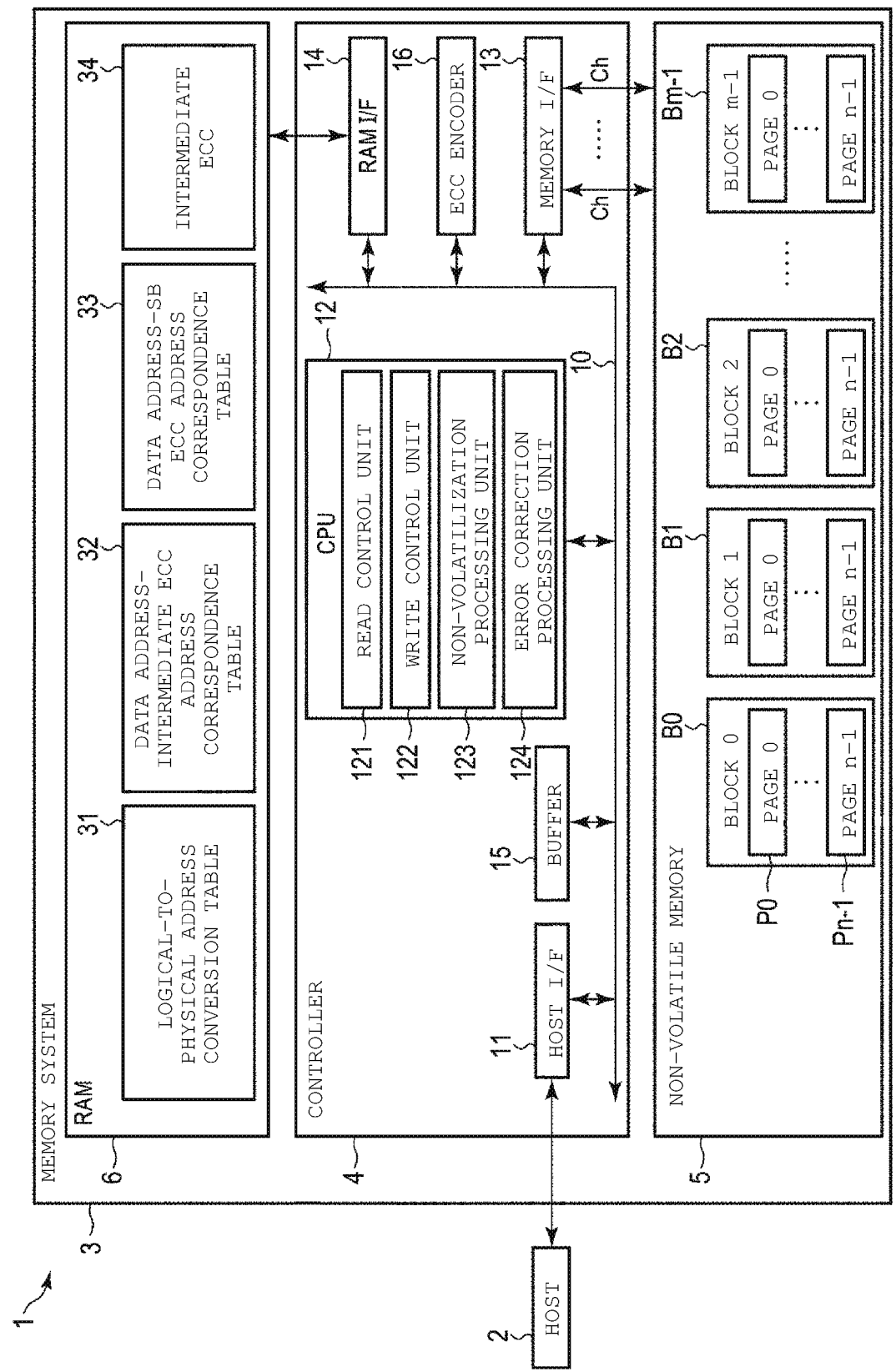
FIG. 1 is a block diagram showing a configuration example of an information processing system including a memory system according to an embodiment.

FIG. 1 is a block diagram showing a configuration of an information processing system 1 according to a first embodiment. The information processing system 1 includes a host 2 (host device) and a memory system 3.

The host 2 is an information processing device (computing device) that accesses the memory system 3. The host 2 may be a server (storage server) that stores a large amount of various data in the memory system 3, or may be a personal computer.

The memory system 3 is a storage device. The memory system 3 may be implemented, for example, as a solid-state drive (SSD) including a NAND flash memory. The memory system 3 may be used as the main storage of the host 2. The memory system 3 is connected to the host 2 via a cable or a network.

As an interface for interconnecting the host 2 and the memory system 3, a SCSI, a Serial Attached SCSI (SAS), ATA, a Serial ATA (SATA), a PCI Express (PCIe), an Ethernet, a Fibre channel, an NVM Express (NVMe) or the like type interface may be used.

The memory system 3 includes a controller 4, a non-volatile memory 5, and a random access memory (RAM) 6.

The controller 4 is a memory controller configured to control the non-volatile memory 5. The controller 4 may be implemented by a circuit such as a System-on-a-chip (SoC), for example. The controller 4 can execute a write operation to the non-volatile memory 5 in any of, for example, SLC mode, MLC mode, TLC mode, and QLC mode. The SLC mode is a mode in which one bit is written per memory cell. The MLC mode is a mode in which 2 bits are written per memory cell. The TLC mode is a mode in which 3 bits are written per memory cell. The QLC mode is a mode in which 4 bits are written per memory cell.

The non-volatile memory 5 is a memory device. The non-volatile memory 5 may be a non-volatile memory having a two-dimensional structure or a non-volatile memory having a three-dimensional structure. The non-volatile memory 5 is implemented as, for example, a NAND flash memory.

The non-volatile memory 5 includes a memory cell array. The memory cell array includes a plurality of memory cells located in a matrix. The memory cell array of the non-volatile memory 5 includes a plurality of blocks. Each block contains a plurality of pages. One block serves as the smallest erasure unit. The block is sometimes referred to as an erase block or a physical block. Each page contains a plurality of memory cells connected to the same word line. One page is a unit of data write operation and data read operation. The word line may be used as a unit of the data write operation and the data read operation. There is an upper limit to the number of allowable Program/Erase cycles (P/E cycles) for each block. One P/E cycle of a block includes an erasing operation for putting all memory cells in the block into an erased state and a write operation (program operation) for writing data into each page of the block.

Further, the non-volatile memory 5 may include a plurality of non-volatile memory chips (for example, a plurality of NAND flash memory dies). Each of the plurality of non-volatile memory chips may be implemented by a flash memory that can store a plurality of bits per memory cell.

The flash memory that can store the plurality of bits per memory cell is, for example, a multi-level cell (MLC or 4LC) flash memory, a triple-level cell (TLC or 8LC) flash memory, or a quad level cell (QLC or 16LC) flash memory. The MLC flash memory can store 2 bits of data per memory cell. The TLC flash memory can store 3 bits of data per memory cell. The QLC flash memory can store 4 bits of data per memory cell. A flash memory that can store 1 bit per memory cell is also referred to as a single-level cell (SLC or 2LC) flash memory.

When the non-volatile memory chip is implemented as the MLC flash memory, normally, two pages of data (lower page data and upper page data) are written into a plurality of memory cells connected to the same word line. As a result, 2 bits can be written per memory cell. Any area (for example, one or more of any blocks) in the MLC flash memory may be used as an area (SLC area) in which only one bit can be stored per memory cell. In the operation of writing data to the SLC area, only one page of data (lower page data) is written into a plurality of memory cells connected to the same word line. As a result, in each block used as the SLC area, only one bit can be written per memory cell, as in the case of each block (SLC block) in the SLC flash memory. As a result, each block used as the SLC area functions as a pseudo SLC block.

When the non-volatile memory chip is implemented as the TLC flash memory, normally, three pages of data (lower page data, middle page data, and upper page data) are written into a plurality of memory cells connected to the same word line. As a result, 3 bits can be written per memory cell. Any area (for example, one or more of any blocks) in the TLC flash memory may be used as the SLC area described above, or may be used as an MLC area capable of storing 2 bits per memory cell. The SLC area or MLC area may be set in units finer than the block (for example, a unit of word lines, a unit of a set of word lines in a block). In the MLC area, only two pages of data are written into a plurality of memory cells connected to the same word line. As a result, in the MLC area, only 2 bits can be written per memory cell.

When the non-volatile memory chip is implemented as the QLC flash memory, normally, four pages of data are written into a plurality of memory cells connected to the same word line. As a result, 4 bits can be written per memory cell. Any area (for example, one or more of any blocks) in the QLC flash memory may be used as the SLC area described above, may be used as the MLC area described above, or may be used as a TLC area capable of storing 3 bits per memory cell. The SLC area or MLC area or TLC area may be set in units finer than the block (for example, a unit of word lines, a unit of a set of word lines in a block). In the TLC area, only three pages of data are written into a plurality of memory cells connected to the same word line. As a result, in the TLC area, 3 bits can be written per memory cell.

The non-volatile memory chip may be able to store 5 bits or more per memory cell. Even in this case, any area of the non-volatile memory chip may be used as an area in which only data of 4 bits or less is written per memory cell.

The RAM 6 is a volatile memory. The RAM 6 is, for example, a dynamic RAM (DRAM). Alternatively, the RAM 6 may be a static RAM (SRAM). The RAM 6 may be an internal configuration of the controller 4. In the following, a case where a DRAM is used as the RAM 6 will be mainly exemplified.

The RAM 6 is provided with a cache area of the logical-to-physical address conversion table 31. Further, the RAM 6 may be provided with a storage area of an error correction code (ECC) (for example, intermediate ECC 34) used for processing, and a table (for example, a data address-intermediate ECC address correspondence table 32, and a data address-save block ECC (SB ECC) address correspondence table 33).

The controller 4 may function as a flash translation layer (FTL) configured to execute data management and block management of the non-volatile memory 5. Data management includes (1) management of mapping information showing the corresponding relation between each logical address and each physical address of the non-volatile memory 5, and (2) processing for concealing the difference between the read and write operation of page units and the erasing operation of block units, and the like. Block management includes defective block management, wear leveling, garbage collection (which may be abbreviated as "GC" or referred also to as "compaction"), and the like. Hereinafter, the processing for data management and block management of the non-volatile memory 5 is also referred to as an FTL process.

The logical address is an address used by the host 2 to specify the memory system 3 as an address. As the logical address, for example, a logical block address (LBA) is used. The management of the mapping between each logical address and each physical address is performed by using the logical-to-physical address conversion table 31. The controller 4 manages the mapping between each logical address and each physical address in a predetermined management size unit by using the logical-to-physical address conversion table 31. The physical address indicates a storage position in the non-volatile memory 5. The logical-to-physical address conversion table 31 may be loaded from the non-volatile memory 5 into the RAM 6 when the memory system 3 is started.

Data can be written into one page only once per P/E cycle. In addition, there is an upper limit to the number of P/E cycles. Therefore, the controller 4 writes the update data corresponding to a certain logical address into another storage position instead of the storage position where the previous data corresponding to the logical address is stored. Then, the controller 4 updates the logical-to-physical address conversion table 31 to associate the logical address with the physical address indicating the other storage position, and invalidates the previous data. Hereinafter, the data referred to from the logical-to-physical address conversion table 31 (that is, the data associated with the logical address) is referred to as valid data. Further, data that is not associated with any logical address is referred to as invalid data. Valid data is data that may later be read from the host 2. Invalid data is data that can no longer be read from the host 2.

The controller 4 includes a host interface (host I/F) 11, a CPU 12, a memory I/F 13, a RAM interface (RAM I/F) 14, a buffer 15, and an ECC encoder 16. The host I/F 11, the CPU 12, the memory I/F 13, the RAM I/F 14, the buffer 15, and the ECC encoder 16 may be interconnected via a bus 10.

The host I/F 11 is a circuit that receives various commands from the host 2. The various commands are, for example, I/O commands and various control commands. The I/O command includes, for example, a write command and a read command. The control command includes, for example, unmap command (trim commands), format command, and flush command. The format command is a command for unmapping the entire memory system 3. The flush command is a command for writing dirty data cached or buffered in the memory system 3 into the non-volatile memory 5. The dirty data is, for example, user data and related management data.

The CPU 12 is a processor configured to control the host I/F 11, the memory I/F 13, the RAM I/F 14, the buffer 15, and the ECC encoder 16. The CPU 12 performs various processes by executing a control program (e.g., firmware) stored in a ROM or the like. The various processes are, for example, an FTL process and a command process. The command process is a process for processing various commands from the host 2. The operation of the CPU 12 is controlled by the above-mentioned firmware executed by the CPU 12. Some or all of the FTL process and the command process may be executed by the dedicated hardware in the controller 4.

The memory I/F 13 is a storage control circuit configured to control the non-volatile memory 5. The memory I/F 13 is, for example, Toggle DDR, Open NAND Flash Interface (ONFI). The controller 4 and the non-volatile memory 5 are electrically connected to each other via the memory I/F 13. The memory I/F 13 may be connected to a plurality of memory chips in the non-volatile memory 5 via a plurality of channels.

The RAM I/F 14 is a controller configured to control the access of the RAM 6.

The buffer 15 is a volatile storage area. The buffer 15 temporarily stores the data to be written into the non-volatile memory 5. The buffer 15 stores, for example, user data. The user data is, for example, data to be written that is received from the host 2 together with a write command. The buffer 15 may store valid data read from the GC source block.

The ECC encoder 16 encodes the data to generate the error correction code (ECC) (e.g., parity) corresponding to the data. As an ECC, for example, Reed-Solomon (RS) code or XOR parity can be used.

Further, the controller 4 may supply the block in the non-volatile memory 5 as, for example, a write destination block or a save block.

The write destination block is a block used as a write destination for the user data.

The save block is a block used to store the data stored in the volatile storage. Data stored in the save block is stored in a non-volatile manner. The data stored in the volatile storage is transferred (written) to the save block when a specific request that requires the determination of the internal state of the memory system 3 is received. The volatile storage area is, for example, the RAM 6 and/or the buffer 15. The specific requests that require a determination of the internal state of the memory system 3 are, for example, a request for transition to a power saving mode, a request for power off (shutdown), and a flush request (for example, a flush command). Hereinafter, any specific request that requires the determination of the internal state of the memory system 3 is also referred to as an internal state determination request. For example, the memory system 3 may shift to the power saving mode or be shut down after the user data stored in the buffer 15 is made non-volatile by writing to the save block in response to the internal state determination request. After that, in the activated memory system 3, since the internal state is fixed, the user data stored in the save block can be used to recover the user data that was stored in the buffer 15.

Writing into a block is performed, for example, in a specific data unit. The specific data unit is, for example, the amount of data that can be written into the non-volatile memory 5 in one data write operation. Hereinafter, this specific data unit is also referred to as a write unit.

The write unit of the save block may be smaller than the write unit of a write destination block, for example. More specifically, the controller 4 writes data into the save block in a first mode in which n-bit data is written per memory cell. Further, the controller 4 writes data into the write destination block in a second mode in which m-bit data is written per memory cell. In this context, n is a number of 1 or greater and m is a number greater than n. The first mode is, for example, a SLC mode. The second mode is, for example, a MLC mode, a TLC mode, or a QLC mode.

Further, for example, the number of the physical blocks configuring a logical block used as the save block can be smaller than the number of the physical blocks configuring the logical block used as the write destination block. The logical block is composed of N physical blocks, where N is an integer of 1 or more. The N physical blocks are a group of blocks in which writing in physical page units can be performed in parallel for each physical block. That is, the controller 4 can perform a write operation for a physical page in each of the N physical blocks (that is, a write operation for the N physical pages) in parallel. Therefore, the write unit of a logical block becomes smaller as the number of the physical blocks configuring the logical block gets smaller. Therefore, the write unit of the logical block used as the save block may be smaller than the write unit of the logical block used as the write destination block.

In some instances, the write unit of the logical block may be smaller than N physical pages. In this case, if the write unit of the logical block used as the save block is j physical pages and the write unit of the logical block used as the write destination block is k physical pages, the value of j is k or less. As a result, the write unit of the logical block used as the save block becomes smaller than the write unit of the logical block used as the write destination block.

As described above, since the write unit of the save block can be smaller than the write unit of the write destination block, the amount of padding data can be reduced in the data writing into the save block as compared with the data writing into the write destination block.

Also, the user data stored in the block is protected by the ECC.

Specifically, the user data stored in the write destination block is protected by either the intermediate ECC or the final ECC.

The intermediate ECC configures an ECC frame having a first frame size (that is, a first frame length) together with the user data of a first protection unit stored in the write destination block. That is, the user data of the first protection unit is protected by the corresponding intermediate ECC. The first protection unit corresponds to, for example, a write unit of the write destination block.

The final ECC is part of an ECC frame having a second frame size (that is, a second frame length) together with user data of a second protection unit size that is stored in a plurality of write destination blocks. That is, the user data of a second protection unit size is protected by a corresponding final ECC associated therewith. The second protection unit size is larger than the first protection unit size. Thus, the second frame size is larger than the first frame size.

Also, the user data stored in the save block is protected by the SB ECC.

The SB ECC is one ECC frame together with user data stored in the save block. That is, the user data stored in the save block is protected by the corresponding SB ECC. The SB ECC is written into the save block.

The ECCs used as final ECCs, the intermediate ECC, and the SB ECC in the memory system 3 are all page-to-page ECCs in this example. The page-to-page ECC is, for example, a linear code. In the memory system 3, the page-to-page ECC or the in-page ECC (Channel ECC) may be used. As the in-page ECC, a Bose Chaudhuri Hocquenghem (BCH) code or a Low Density Parity Check (LDPC) code can be used, for example.

Here, the characteristics of the write mode for the non-volatile memory 5 will be described.

FIG. 2 shows the characteristics of the write mode used in the memory system 3 according to the embodiment. The data density per memory cell in the SLC mode is two values (1 page). The data density per memory cell in the MLC mode is 4 values (2 pages). The data density per memory cell in the TLC mode is 8 values (3 pages). The data density per memory cell in the QLC mode is 16 values (4 pages).

The data read speed and write speed for the non-volatile memory 5 becomes slower as the data density becomes higher and faster as the data density becomes lower. Therefore, among the SLC mode, the MLC mode, the TLC mode, and the QLC mode, the reading and writing of data in the QLC mode is the slowest and the SLC mode is the fastest.

Next, tables used in the memory system 3 will be described.

FIG. 3 shows a configuration example of the logical-to-physical address conversion table 31 used in the memory system 3 according to the embodiment. The logical-to-physical address conversion table 31 is implemented as, for example, a look-up table (LUT). The logical-to-physical address conversion table 31 manages the mapping between each logical address and a physical address in the non-volatile memory 5.

FIG. 4 shows a configuration example of the data address-intermediate ECC address correspondence table 32 used in the memory system 3 according to the embodiment. The data address-intermediate ECC address correspondence table 32 may include a plurality of entries corresponding to each of a plurality of ECC frames protected by the intermediate ECC. The ECC frame protected by the intermediate ECC is stored in a write destination block and is composed of user data of a write unit (first protection unit) for which the corresponding final ECC is not yet written in the write destination block, and the intermediate ECC. Each of the plurality of entries includes a field for the physical address of the user data and a field for the physical address of the intermediate ECC.

The value for the physical address of the user data is in the corresponding ECC frame and indicates the physical address of the user data stored in a write destination block.

The physical address of the intermediate ECC is in the corresponding ECC frame and indicates the physical address of the intermediate ECC stored in the RAM 6 or the save block. That is, the physical address of the intermediate ECC indicates the storage area in the RAM 6 at which the intermediate ECC is stored or the physical address in the non-volatile memory 5 at which the intermediate ECC is stored.

FIG. 5 shows a configuration example of the data address-SB ECC address correspondence table 33 used in the memory system 3 according to the embodiment. The data address-SB ECC address correspondence table 33 may include a plurality of entries corresponding to the plurality of ECC frames protected by the SB ECC. An ECC frame protected by the SB ECC includes user data of one or more cluster units and the SB ECC of the one or more cluster units. The user data of one or cluster units is stored in one or more save blocks, respectively. The SB ECC of one or more cluster units is stored in one or more save blocks, respectively. Each of the plurality of entries includes a field for the physical address of the user data and a field for the physical address of the SB ECC.

The field for the physical address of the user data indicates one or more physical addresses in which the user data of one or more cluster units of the corresponding ECC frame is stored.

The field for the physical address of the SB ECC indicates one or more physical addresses in which the SB ECC of one or more cluster units of the corresponding ECC frame is stored.

The configurations of the logical-to-physical address conversion table 31, the data address-intermediate ECC address correspondence table 32, and the data address-SB ECC address correspondence table 33 may be changed as appropriate according to the design of the hardware and software (for example, firmware) configuring the memory system 3.

The CPU 12 of the controller 4 in FIG. 1 can function as a read control unit 121, a write control unit 122, a non-volatilization processing unit 123, and an error correction processing unit 124. The CPU 12 can function as the read control unit 121, the write control unit 122, the non-volatilization processing unit 123, and the error correction processing unit 124, for example, by executing firmware.

The read control unit 121 controls each unit in the controller 4 to perform a read operation. The read operation is, for example, an operation for reading user data from the non-volatile memory 5 according to a read command from the host 2. The read operation may be an operation for reading user data from the non-volatile memory 5 in the internal operation of the memory system 3 (for example, GC operation, refresh operation, wear leveling operation).

The write control unit 122 receives the user data to be written into the non-volatile memory 5 from the host 2 according to the reception of the write command from the host 2. Then, the wright control unit 122 controls each unit in the controller 4 to perform a wright operation. The write operation is, for example, an operation for writing the user data received from the host 2 into the non-volatile memory 5. The write operation may be an operation for writing user data into the non-volatile memory 5 in the internal operation of the memory system 3.

The non-volatilization processing unit 123 performs a non-volatilization operation for making the data initially stored in the volatile storage area non-volatile (stored in a non-volatile storage area) in response to an internal state determination request. The non-volatilization operation includes, for example, an operation for making the intermediate ECC non-volatile, and an operation for making the unwritten user data stored in the buffer 15 and the corresponding SB ECC non-volatile. Therefore, it can be said that the internal state determination request includes a request to make the intermediate ECC non-volatile, a request to make the unwritten user data stored in the buffer 15 and the corresponding SB ECC non-volatile.

The error correction processing unit 124 performs error correction processing when an error occurs in the user data read from the non-volatile memory 5. Further, the error correction processing unit 124 performs error correction processing when the user data writing into the non-volatile memory 5 fails.

Here, the non-volatilization operation in response to the internal state determination request in the memory system 3 will be described.

The controller 4 writes the data stored in the volatile storage area such as the RAM 6 and the buffer 15 into the non-volatile memory 5 in response to the internal state determination request. By writing the data stored in the volatile storage area into the non-volatile memory 5, the internal state of the memory system 3 can be determined. For example, when the controller 4 writes the data stored in the RAM 6 and the buffer 15 into the non-volatile memory 5 in response to the flush command received from the host 2, it is possible to guarantee that the internal state of the memory system 3 does not return to the state before the processing in response to the flush command is completed.

The controller 4 writes into the block in a specific data unit (write unit). The data stored in the volatile storage area may be less than the write unit. In this case, the controller 4 writes the data stored in the volatile storage area into the block with padding. Writing the data with padding means writing the data of the write unit composed of data to be written and padding data.

When writing the data stored in the volatile storage area into the non-volatile memory 5 in response to the internal state determination request, the data is often written into the block with padding. Therefore, the amount of useless padding data written into the non-volatile memory 5 tends to increase.

Figure 6:
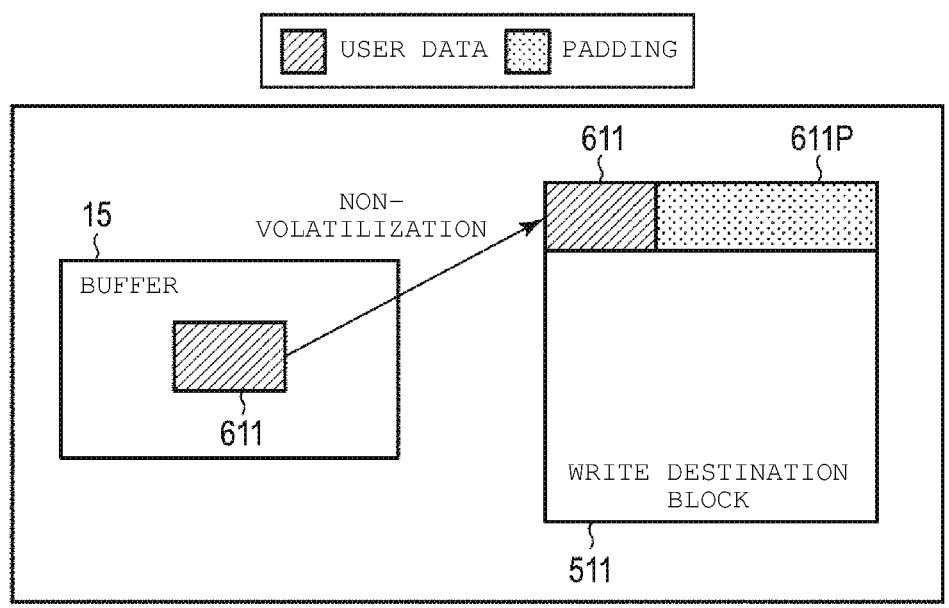
FIG. 6 is a diagram showing an example of user data that is written from a buffer to a write destination block.

FIG. 6 shows an example of user data that is made non-volatile from the buffer 15 to the write destination block. The user data 611 is stored in the buffer 15. The size of the user data 611 does not reach the write unit to the write destination block. The write destination block 511 is a block in the non-volatile memory 5.

In response to the internal state determination request, the user data 611 is written into the write destination block 511 with padding. That is, the data of the write unit composed of the user data 611 and the padding data 611P is written into the write destination block 511. As a result, the user data 611 stored in the buffer 15 is made non-volatile. Then, the storage area in the buffer 15 that stores the user data 611 is released.

Figure 7:
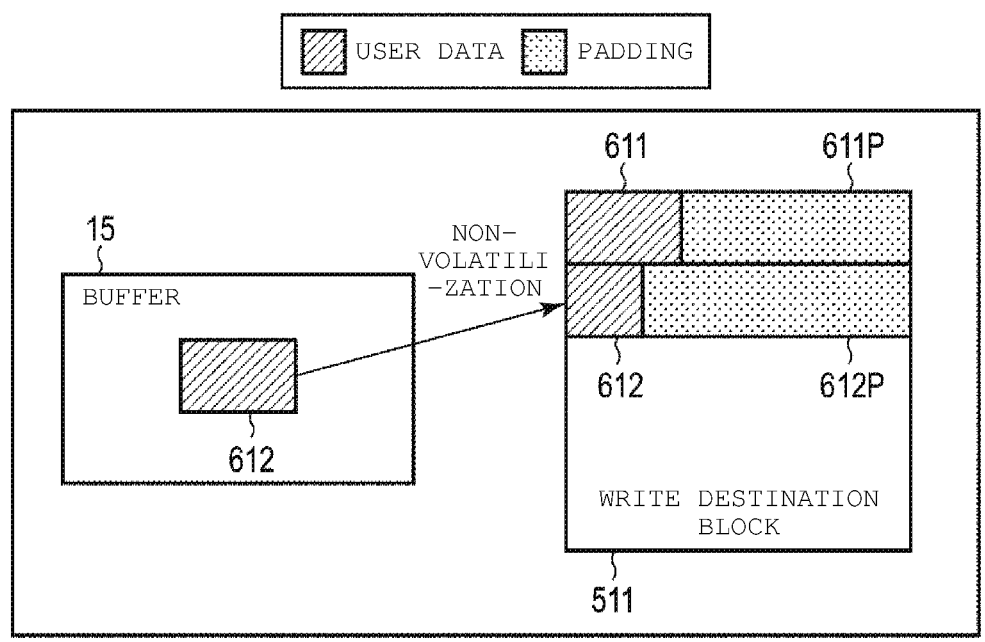
FIG. 7 is a diagram showing an example of other user data that is written from the buffer to the write destination block.

FIG. 7 shows an example of another user data that is made non-volatile from the buffer 15 to the write destination block 511 following FIG. 6. The user data 612 is stored in the buffer 15. The size of the user data 612 does not reach the write unit to the write destination block.

In response to the internal state determination request, the user data 612 is written into the write destination block 511 with padding. That is, the data of the write unit composed of the user data 612 and the padding data 612P is written into the write destination block 511. As a result, the user data 612 stored in the buffer 15 is made non-volatile. Then, the storage area in the buffer 15 that stores the user data 612 is released.

As shown in FIGS. 6 and 7, when each of the user data 611 and 612 stored in the buffer 15 is written into the write destination block 511 in response to the internal state determination request, a large amount of useless padding data written into the write destination block 511 is generated.

Next, a case where the save block is used instead of the write destination block for writing the data stored in the RAM 6 and the buffer 15 in response to the internal state determination request will be described. A save block is a block having a smaller write unit than a write destination block.

Figure 8:
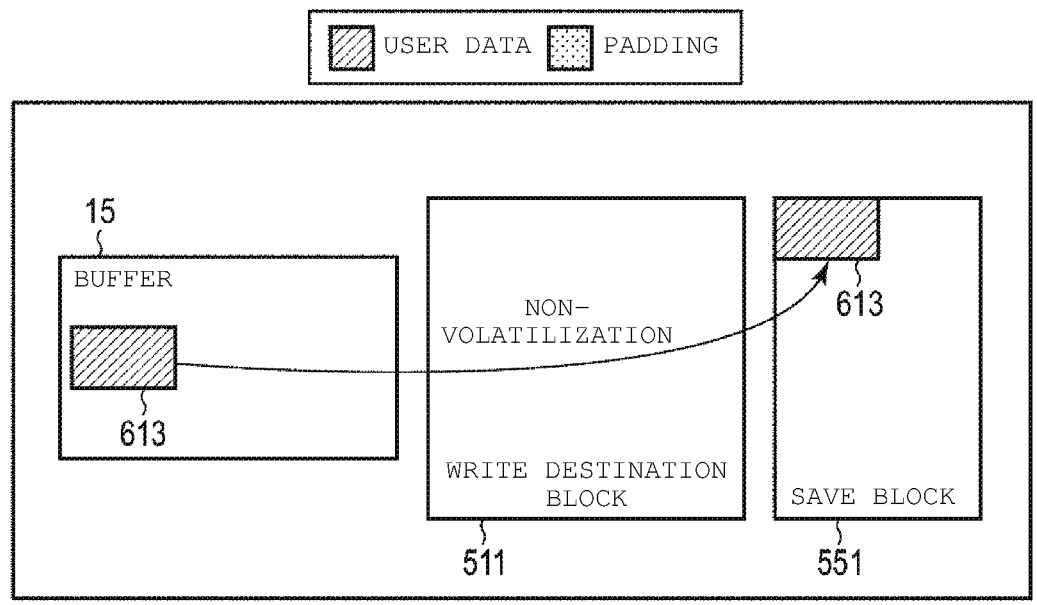
FIG. 8 is a diagram showing an example of user data that is written from the buffer to a save block.

FIG. 8 shows an example of user data that is made non-volatile from the buffer 15 to the save block. User data 613 is stored in the buffer 15. The size of the user data 613 corresponds to a write unit to the save block. The save block 551 is a block in the non-volatile memory 5.

The user data 613 is written into the save block 551 in response to the internal state determination request. Since the size of the user data 613 corresponds to the write unit to the save block, the user data 613 is written into the save block 551 as it is without adding padding data. As a result, the user data 613 stored in the buffer 15 is made non-volatile.

The size of the user data 613 is less than the write unit to the write destination block. By writing the user data 613 into the save block 551, it is possible to eliminate the writing of the padding data that occurs when the user data 613 is written into the write destination block 511.

Figure 9:
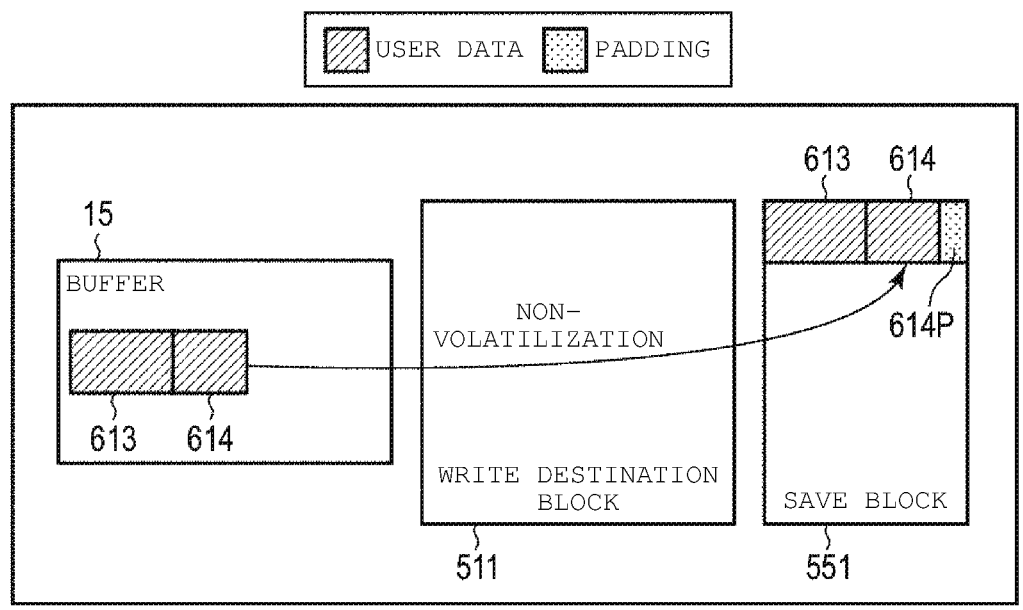
FIG. 9 is a diagram showing an example of other user data that is written from the buffer to the save block.

FIG. 9 shows an example of another user data that is made non-volatile from the buffer 15 to the save block 551 following FIG. 8. User data 613 and user data 614 are stored in the buffer 15. The size of the user data 614 does not reach the write unit to the save block.

In response to the internal state determination request, the user data 614 that is not non-volatile is written into the save block 551 with padding. That is, the data of the write unit composed of the user data 614 and the padding data 614P is written into the save block 551. As a result, the user data 614 stored in the buffer 15 is made non-volatile.

The write unit to the save block is smaller than the write unit to the write destination block. Therefore, when the user data 614 is written into the save block 551, the amount of padding data written into the non-volatile memory 5 can be reduced as compared with the case where the user data 614 is written into the write destination block 511.

Therefore, as shown in FIGS. 8 and 9, when writing each of the user data 613 and 614 stored in the buffer 15 into the save block 551 in response to the internal state determination request, the amount of useless padding data written into the non-volatile memory 5 can be reduced as compared with the case of writing each of the user data 613 and 614 into the write destination block 511.

Figure 10:
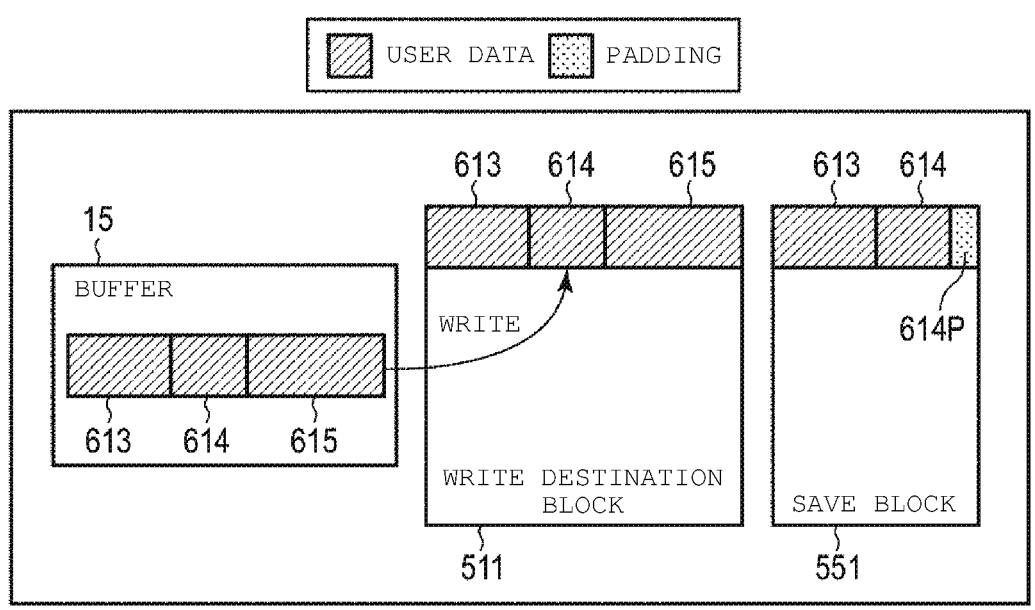
FIG. 10 is a diagram showing an example of user data to be written into a write destination block.

FIG. 10 shows an example of user data written from the buffer 15 into the write destination block 511 following FIG. 9. The user data 613, the user data 614, and the user data 615 are stored in the buffer 15. The total data size (total data amount) of the user data 613, the user data 614, and the user data 615 corresponds to a write unit to the write destination block.

When the total data size of the user data 613, the user data 614, and the user data 615 stored in the buffer 15 reaches the write unit to the write destination block, the user data 613, the user data 614, and the user data 615 of the write units are written into the write destination block 511.

In this way, when the user data is written into the non-volatile memory 5 in response to the internal state determination request, the user data is written into the save block 551, and thus, the padding data can be prevented from being written into the write destination block 511.

Next, a function for remedying a burst error will be described. The burst error is an error that occurs intensively on data in a specific storage area. The burst error is, for example, a block loss. To remedy the burst error, the block is protected by using the ECC. More specifically, for example, the data in which the error occurs can be corrected by using the ECC.

The ECC that protects the write destination block and the ECC that protects the save block will be described below.

(ECC that Protects the Write Destination Block)

The user data stored in the write destination block is protected by either the intermediate ECC or the final ECC.

Figure 11:
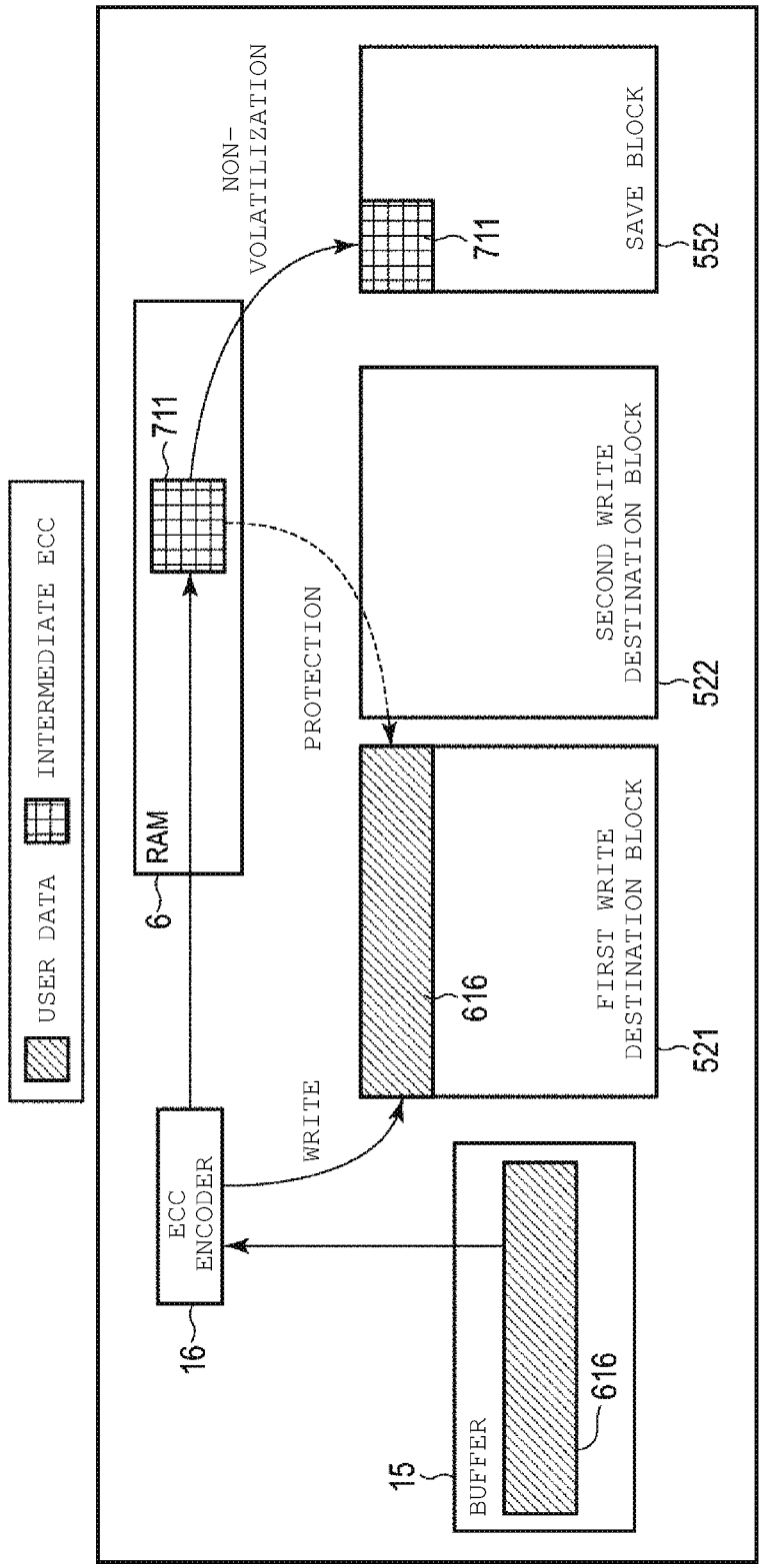
FIG. 11 is a diagram showing an example of user data to be written into a write destination block and an intermediate ECC that protects the user data.

FIG. 11 shows an example of user data written into the write destination block and an intermediate ECC that protects the user data. User data 616 is stored in the buffer 15. The size of the user data 616 corresponds to the write unit to the write destination block. The first write destination block 521, the second write destination block 522, and the save block 552 are blocks in the non-volatile memory 5.

The ECC encoder 16 encodes the user data 616 corresponding to the write unit to generate the intermediate ECC 711. The RAM 6 stores the generated intermediate ECC 711. Further, the user data 616 is written into the first write destination block 521. Then, the storage area in the buffer 15 that stores the user data 616 is released. As a result, the user data 616 stored in the first write destination block 521 is protected by the intermediate ECC 711 stored in the RAM 6. The user data 616 corresponds to the user data of the first protection unit. Further, the user data 616 and the intermediate ECC 711 configure an ECC frame having a first frame size.

Next, the intermediate ECC 711 stored in the RAM 6 is made non-volatile in response to the internal state determination request. Specifically, the intermediate ECC 711 is written into, for example, the save block 552. As a result, the non-volatile intermediate ECC 711 can protect the user data 616 stored in the first write destination block 521.

Figure 12:
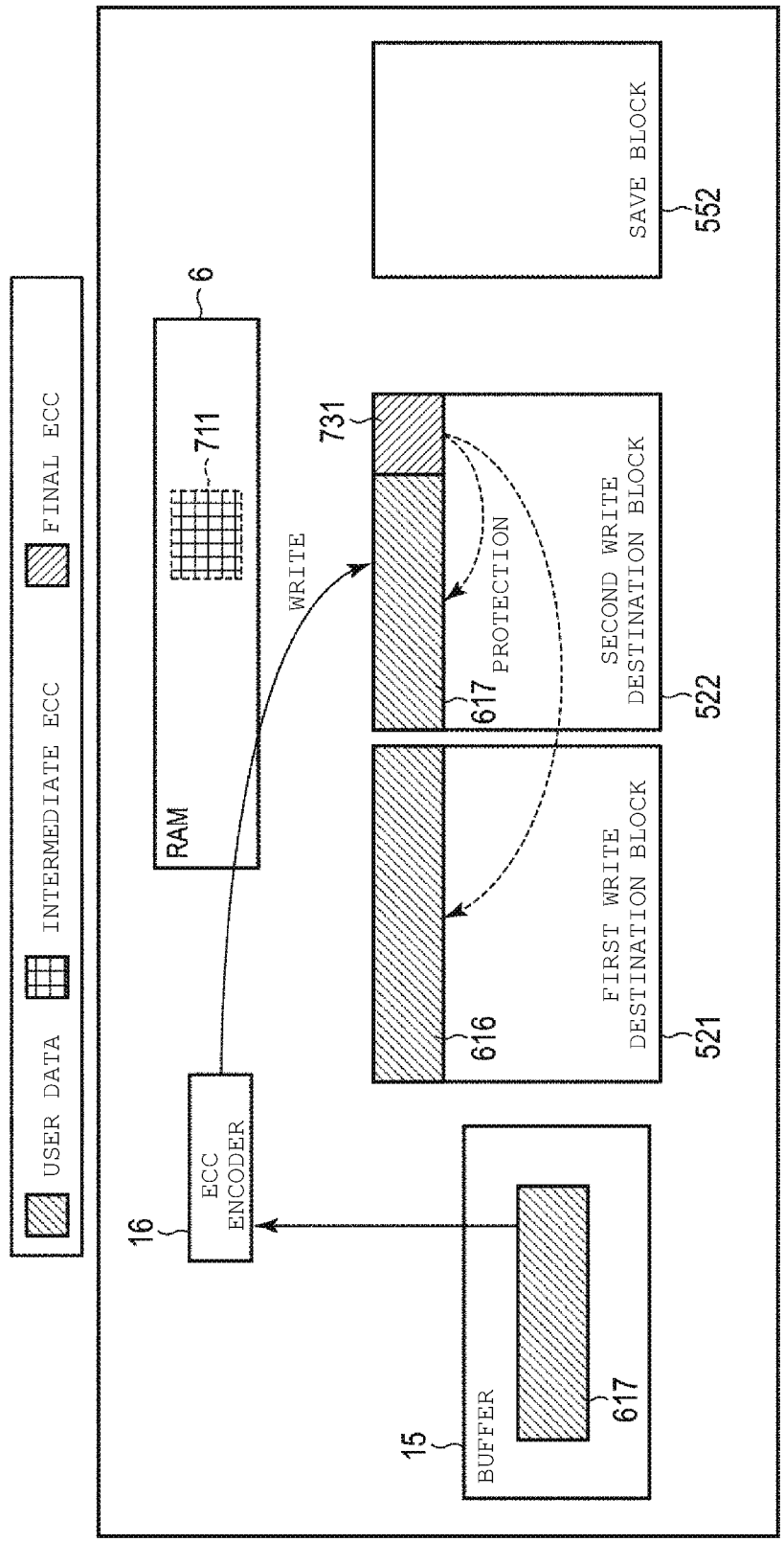
FIG. 12 is a diagram showing an example of user data to be written into a write destination block and a final ECC.

FIG. 12 shows an example of user data and the final ECC written into the write destination block. Here, it is assumed that the intermediate ECC 711 corresponding to the user data 616 (see FIG. 11) is still stored in the RAM 6. After the user data 616 has been written into the first write destination block 521, the user data 617 is stored in the buffer 15. The user data 617 has a size set by subtracting the final ECC amount (that is, the data size of the final ECC) from the write unit size of the write destination blocks.

After writing the user data 616 into the first write destination block 521, the controller 4 then encodes both the user data 616 and the user data 617 with the ECC encoder 16 to generate the final ECC 731. The controller 4 next writes the user data 617 and the final ECC 731 into the second write destination block 522 (the user data 617+final ECC 731 is one write unit in size total). As a result, the user data 616 and the user data 617 are both protected by the final ECC 731. The user data 616 and the user data 617 correspond to user data of the second protection unit size, and together the user data 616 and the user data 617 may be referred to as a second protection unit. The user data 616, the user data 617, and the final ECC 731 together configure an ECC frame having a second frame size.

If the internal state determination request is received after the final ECC 731 is written into the second write destination block 522, the intermediate ECC 711 is not written into the save block 552. This is because the user data 616 is protected by the final ECC 617.

The user data in the second protection unit protected by a final ECC may include a plurality of user data of the first protection unit size. That is, in FIG. 12, an example is shown in which the user data in the second protection unit includes the user data 616 of the first protection unit size, but the user data in the second protection unit may include a plurality of user data of the first protection unit size each written into a different write destination block.

That is, when the controller 4 writes (d−1) first protection units of user data respectively into the (d−1) ECC frames of the first frame size into the non-volatile memory 5 (more specifically, d−1 write destination blocks), the d−1 first protection units of user data and the user data 617 are encoded to generate the final ECC 731, where d is an integer of 2 or greater. Then, the controller 4 writes the user data 617 and the final ECC 731 into the second write destination block 522. As a result, the user data of the second protection unit size consisting of the (d−1) first protection units of user data and the user data 617 is protected by the final ECC 731.

(ECC that Protects the Save Block)

The user data stored in the save block is protected by the SB ECC.

Figure 13:
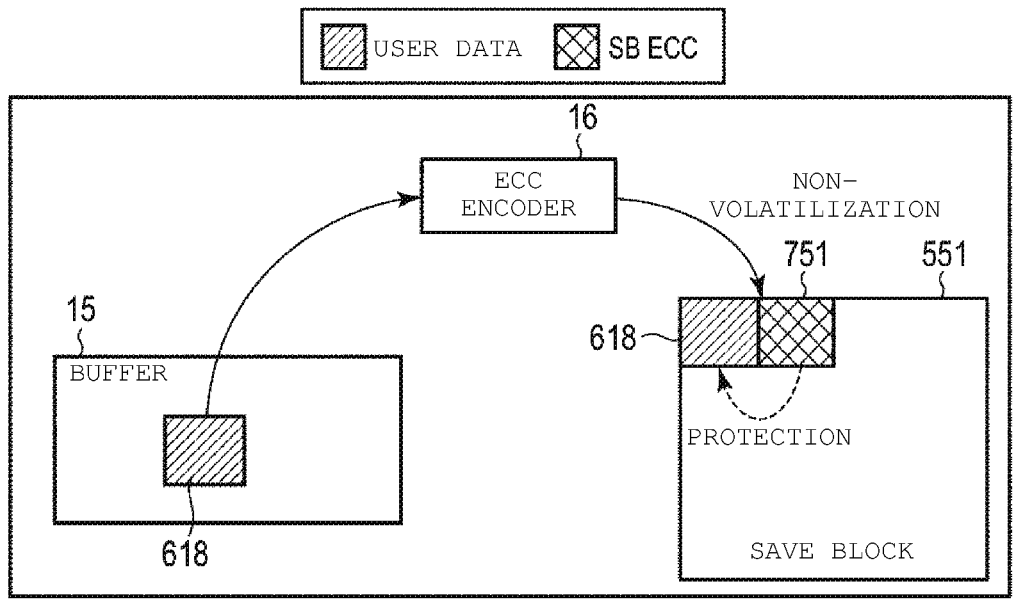
FIG. 13 is a diagram showing an example of user data that is transferred from the buffer to the save block and SB ECC that protects the user data.

FIG. 13 shows an example of user data that is made non-volatile from the buffer 15 to the save block and SB ECC that protects the user data. User data 618 is stored in the buffer 15.

In response to the internal state determination request, the user data 618 is encoded by the ECC encoder 16 to generate the SB ECC 751. Then, the user data 618 and the SB ECC 751 are written into the save block 551. As a result, the user data 618 is made non-volatile and protected by SB ECC 751. That is, the user data 618 and the SB ECC 751 configure one ECC frame.

Figure 14:
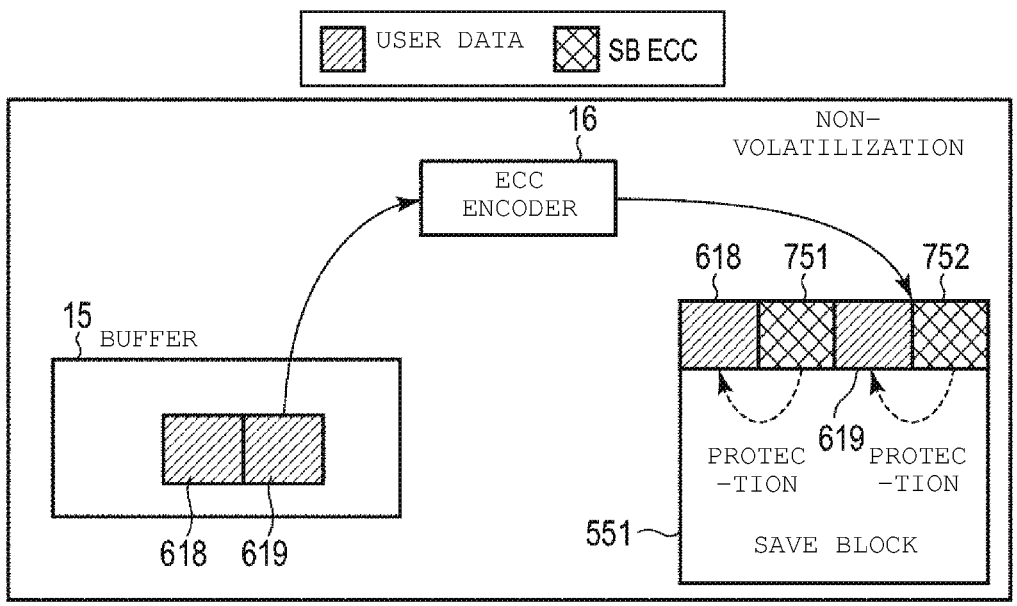
FIG. 14 is a diagram showing an example of other user data that is transferred from the buffer to the save block and SB ECC that protects this other user data.

FIG. 14 shows an example of another user data that is made non-volatile from the buffer 15 to the save block following FIG. 13 and the SB ECC that protects the other user data. The user data 618 and the user data 619 are stored in the buffer 15.

In response to the internal state determination request, the user data 619 that is not non-volatile is encoded by the ECC encoder 16 to generate the SB ECC 752. Then, the user data 619 and the SB ECC 752 are written into the save block 551. As a result, the user data 619 is made non-volatile and protected by SB ECC 752. That is, the user data 619 and the SB ECC 752 configure one ECC frame.

Here, an example will be described in which the intermediate ECC stored in the RAM 6 and the user data stored in the buffer 15 are made non-volatile when an internal state determination request is received.

Figure 15:
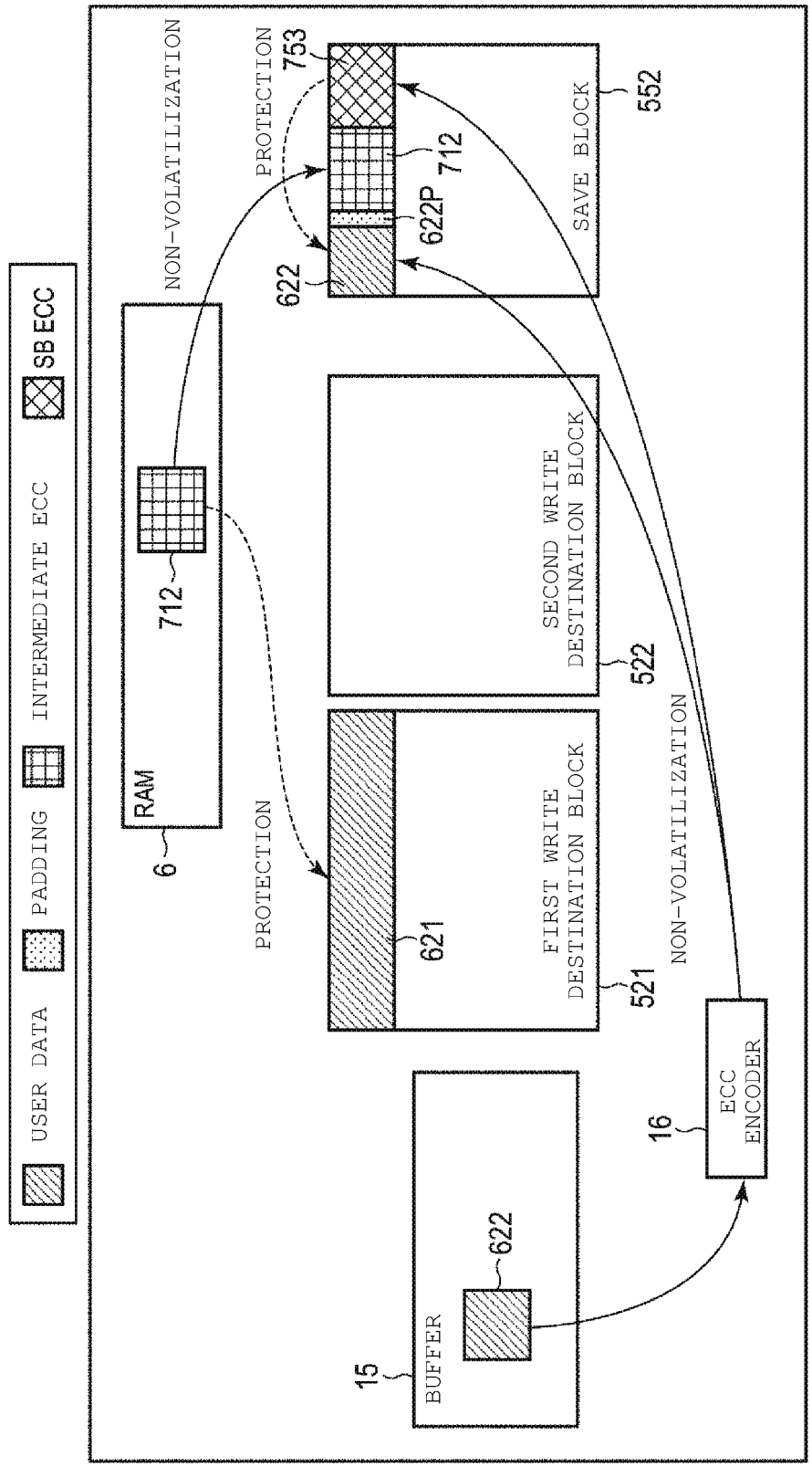
FIG. 15 is a diagram showing an example of user data and intermediate ECC that are transferred to the save block, and SB ECC that protects the user data.

FIG. 15 shows an example of user data and the intermediate ECC that is not non-volatile in a save block, and the SB ECC that protects the user data. The user data 621 is stored in the first write destination block 521. The RAM 6 stores an intermediate ECC 712 that protects the user data 621. Further, user data 622 is stored in the buffer 15. The size of the user data 622 does not reach the write unit to the save block.

In response to the internal state determination request, the user data 622 and the padding data 622P are encoded by the ECC encoder 16 to generate the SB ECC 753. The total data size of the user data 622 and the padding data 622P corresponds to the write unit to the save block.

Then, the user data 622, the intermediate ECC 712 and the SB ECC 753 are written into the save block 552. As a result, the user data 622 is made non-volatile and protected by the SB ECC 753. That is, the user data 622 and the SB ECC 753 configure one ECC frame. In addition, the intermediate ECC 712 is made non-volatile. As a result, the non-volatile intermediate ECC 712 can protect the user data 621.

In this way, when the internal state determination request is received, not only the user data but also the intermediate ECC and the SB ECC may be written into the save block.

For some workloads for the memory system 3, the internal state determination request is frequently issued. For example, in a request workload based on Tera Byte Written (TBW) for SSDs for clients, flush commands may be issued frequently. This is because, for example, in SSDs for clients that do not have the Power Loss Protection (PLP) function, it is necessary to make data non-volatile using flush commands to prevent data loss in the event of an unexpected shutdown in which the power supply is cut off. TBW is one of the indicators of the lifetime of the memory system 3. Further, the PLP function is a function that is stored in the RAM 6 or the buffer 15 by using the electric power supplied from the power storage device when the electric power supplied to the memory system 3 from the external power supply is cut off, and writes the user data that is not written in the non-volatile memory 5 or the like into the non-volatile memory 5.

If data writing into the save block occurs frequently in response to the internal state determination request, the writing amounts of the intermediate ECC and the SB ECC increase. For some workloads, the amount of data written into the save block may be several times (e.g., 3.5 times) the amount of data written into a normal write destination block. Most of the amount of data written into the save block is relates to the writing of the intermediate ECCs and the SB ECCs. Therefore, in a workload environment in which the internal state determination requests are frequently issued, the amount of data written into the save block increases, and it becomes difficult to meet the customer's write lifetime requirements.

Therefore, in the memory system 3 of the present embodiment, to reduce the amount of data written into the save block, (A) the amount of intermediate ECC written into the save block is reduced, and (B) the amount of the padding data and SB ECC written into the save block are reduced.

(Reduction of the Amount of Intermediate ECC Written into the Save Block)

First, (A) a method for reducing the amount of intermediate ECC written into the save block will be described. The controller 4 generates an intermediate ECC that is smaller in size than the intermediate ECC stored in the RAM 6 in response to the internal state determination request. Hereinafter, the intermediate ECC stored in the RAM 6 is also referred to as a first intermediate ECC. The intermediate ECC that is smaller in size than the first intermediate ECC and generated in response to the internal state determination request is also referred to as a second intermediate ECC. The size of the first intermediate ECC is also referred to as a first size. Further, the size of the second intermediate ECC is also referred to as a second size.

The controller 4 encodes the user data at a coding rate (code rate) higher than that of the first intermediate ECC to generate the second intermediate ECC. As a result, the controller 4 generates the second intermediate ECC, which is smaller in size than the first intermediate ECC. The encoding rate indicates the ratio of the data to be encoded to the total data size of the data to be encoded and the ECC obtained by coding. The controller 4 writes the second intermediate ECC into the save block (that is, makes the second intermediate ECC non-volatile). That is, when the controller 4 receives the internal state determination request, the controller 4 does not write the first intermediate ECC into the save block but writes the second intermediate ECC into the save block. As a result, the controller 4 can reduce the amount of intermediate ECC written into the save block.

Figure 16:
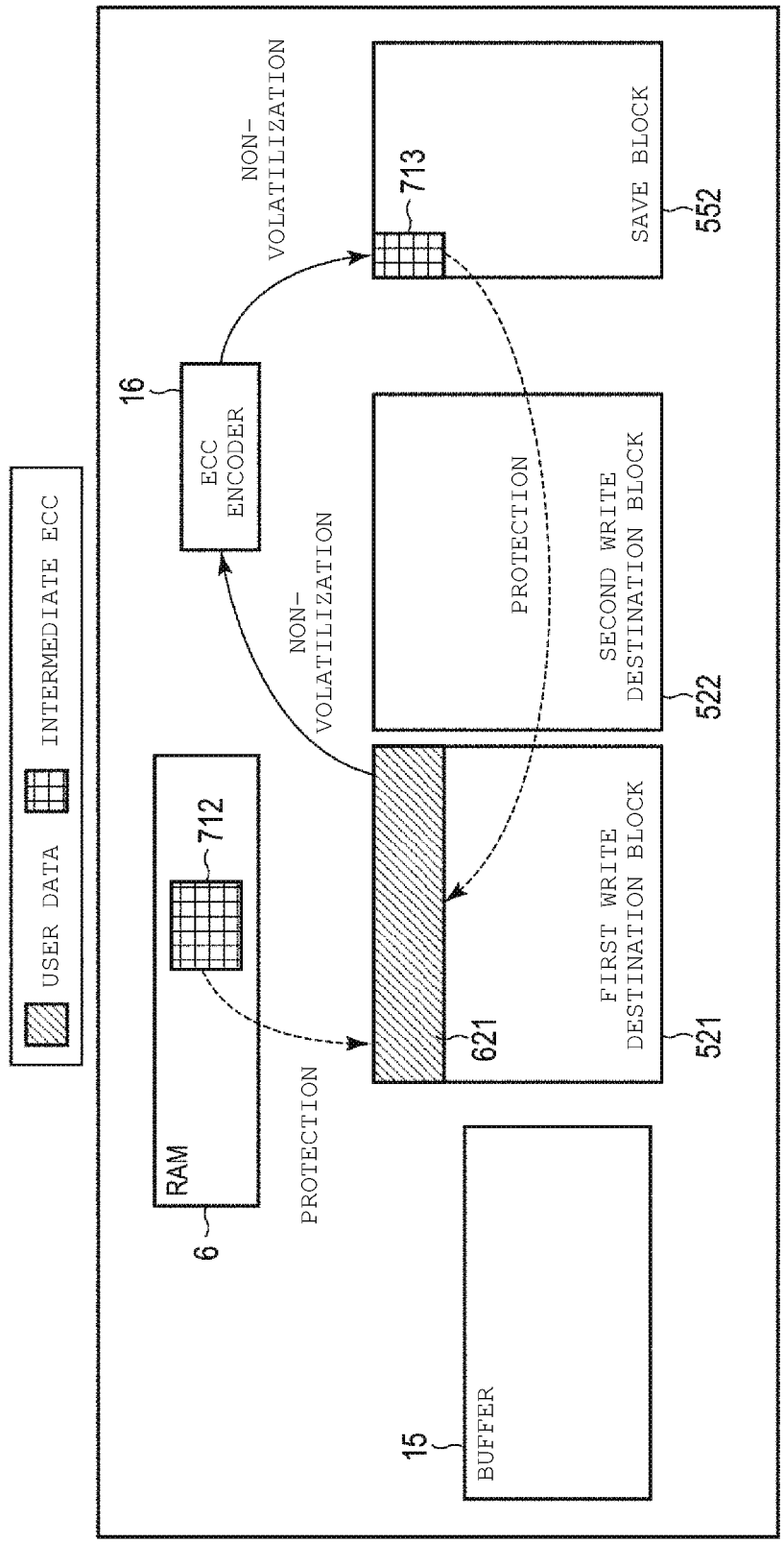
FIG. 16 is a diagram showing an example of first intermediate ECC stored in a random access memory (RAM) and second intermediate ECC in a save block in a memory system according to an embodiment.

FIG. 16 shows an example of the first intermediate ECC stored in the RAM 6 and the second intermediate ECC to be made non-volatile in the save block in the memory system 3 according to the embodiment. User data 621 is stored in the first write destination block 521. The RAM 6 stores the first intermediate ECC 712 that protects the user data 621.

The controller 4 encodes the user data 621 with the ECC encoder 16 in response to the internal state determination request to generate the second intermediate ECC 713. Here, the coding rate when the ECC encoder 16 encodes the user data 621 to generate the first intermediate ECC 712 is defined as a first coding rate. Further, the coding rate when the ECC encoder 16 encodes the user data 621 to generate the second intermediate ECC 713 is defined as a second coding rate. The second coding rate is higher than the first coding rate. Therefore, the size of the second intermediate ECC 713 is smaller than the size of the first intermediate ECC 712.

The controller 4 writes the generated second intermediate ECC 713 into the save block 552. As a result, the amount of intermediate ECC written into the save block 552 can be reduced as compared with the case where the first intermediate ECC 713 is written into the save block 552.

The intermediate ECC generated by changing the coding rate will be described with reference to FIGS. 17 and 18. Here, a case where an intermediate ECC is generated for the user data 81 written into a total of k blocks will be illustrated, where k is an integer of 1 or greater.

Figure 17:
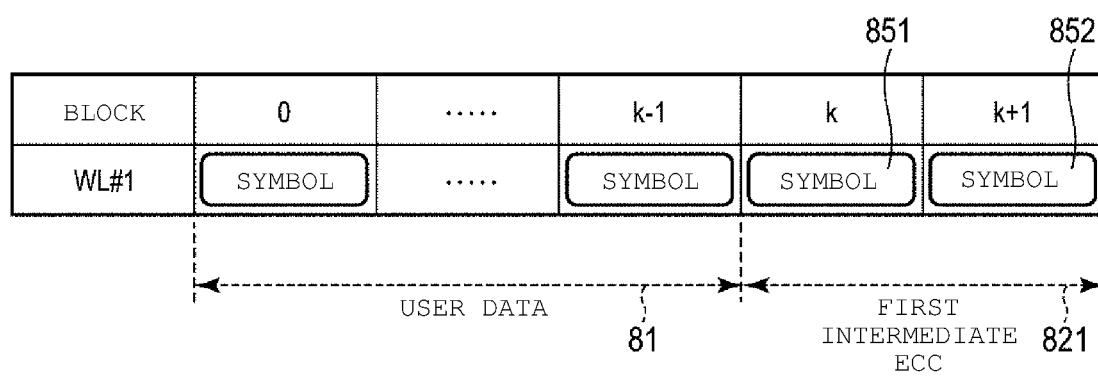
FIG. 17 is a diagram showing an example of a first intermediate ECC generated by encoding user data at a first coding rate.

FIG. 17 shows an example of the first intermediate ECC 821 generated by encoding the user data 81 at the first coding rate in the memory system 3 according to the embodiment. When the user data 81 is encoded at the first coding rate, for example, one symbol is assigned to the user data of the first data unit written into one block. The first data unit is, for example, a page unit. One symbol functions as a unit of protecting user data. More specifically, one symbol serves as a unit of coding and error correction. One symbol has the size of the first data unit. Hereinafter, the size of the first data unit is also referred to as a third size.

Here, a case where ECC corresponding to two symbols having the third size is required to correct a random error generated in one symbol is exemplified. In this case, for the user data 81, for example, a first intermediate ECC 821 including two symbols 851 and 852 having the third size is generated. Therefore, the size of the first intermediate ECC 821 (first size) is twice that of the third size.

The first intermediate ECC 821, which includes two symbols 851 and 852 having the third size, can remedy the loss of the two symbols having the third size. Therefore, it is said that the first intermediate ECC 821 can remedy the loss of two blocks.

The number of blocks that are lost at the same time may vary depending on the degree of parallelism of data write. More specifically, a plurality of blocks into which the data is written in parallel may be lost at the same time. Therefore, the controller 4 may limit the number of blocks (number of planes) for writing data in parallel up to two based on the remedy capability of the loss of two blocks by the first intermediate ECC 821. For example, the controller 4 is configured to write the data portion having a size corresponding to two symbols having the third size in the user data 81 in parallel to two blocks. As a result, it is possible to reduce the possibility that an error exceeding the remedy capability of the first intermediate ECC 821 occurs in the written user data 81.

The first intermediate ECC 821 may also include a symbols having the third size. If the correction of a random error occurring in one symbol requires ECC corresponding to two symbols having the third size, then α is an integer of 2 or greater. In this case, the controller 4 may limit the number of blocks for writing data in parallel based on the remedy capability of the loss of the block corresponding to the α symbols having the third size. For example, the controller 4 is configured to write the data portion having a size corresponding to a symbols having the third size in the user data 81 in parallel to a blocks.

Figure 18:
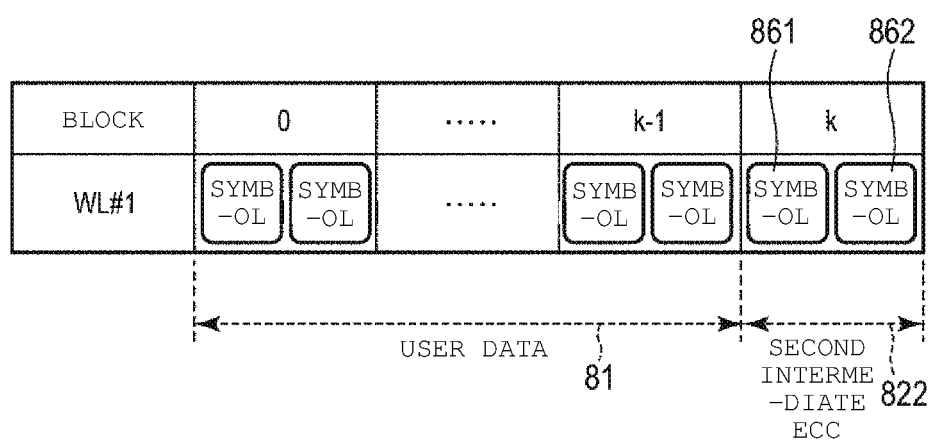
FIG. 18 is a diagram showing an example of a second intermediate ECC generated by encoding user data at a second coding rate.

FIG. 18 shows an example of a second intermediate ECC 822 generated by encoding the user data 81 at the second coding rate in the memory system 3 according to the embodiment. When the user data 81 is encoded at the second coding rate, for example, two symbols are assigned to the user data of the first data unit written into one block. That is, one symbol is assigned to the user data having a size half the size of the first data unit. Thus, one symbol has half the size of the first data unit. Hereinafter, half the size of the first data unit is also referred to as a fourth size.

Here, an example is given when ECC corresponding to two symbols having the fourth size is required to correct a random error generated in one symbol. In this case, for the user data 81, for example, the second intermediate ECC 822 including two symbols 861 and 862 having the fourth size is generated. The size of the second intermediate ECC 822 (second size) is twice the size of the fourth size (=third size). Therefore, the size of the second intermediate ECC 822 is smaller than the size of the first intermediate ECC 821 (first size) shown in FIG. 17.

The second intermediate ECC 822, which includes two symbols 861 and 862 having the fourth size, can remedy the loss of the two symbols having the fourth size. Therefore, it is said that the second intermediate ECC 822 can remedy the loss of one block.

The controller 4 may limit the number of blocks for writing data in parallel up to one based on the remedy capability of one block loss by the second intermediate ECC 822. For example, the controller 4 is configured to write a data portion having a size corresponding to two symbols having the fourth size in the user data 81 into one block. As a result, it is possible to reduce the possibility that an error exceeding the remedy capacity of the second intermediate ECC 822 occurs in the written user data 81. The remedy capability of the second intermediate ECC 822 is lower than the remedy capability of the first intermediate ECC 821. However, by limiting the number of blocks for writing data in parallel based on the remedy capability of the second intermediate ECC 822, it is possible to prevent the influence of the decrease in the remedy capability from occurring. That is, even a small size second intermediate ECC 822 can handle the error.

Further, the second intermediate ECC 822 may include β symbols having the fourth size. If the correction of a random error occurring in one symbol requires an ECC corresponding to two symbols having the fourth size, then β is an integer of 2 or greater. In this case, the controller 4 may limit the number of blocks for writing data in parallel based on the remedy capability of the loss of the block corresponding to β symbols having the fourth size. For example, the controller 4 is configured to write the data portion having a size corresponding to β symbols having the fourth size in the user data 81 in parallel into β/2 blocks.

Here, the coding rate in the examples shown in FIGS. 17 and 18 will be described.

The first coding rate when the first intermediate ECC 821 is generated for the user data 81 is expressed by the following equation.

$$\text{First coding rate} = \text{user data size}/(\text{user data size} + \text{first intermediate ECC size})$$

Further, the second coding rate when the second intermediate ECC 822 is generated for the user data 81 is expressed by the following equation.

$$\text{Second coding rate} = \text{user data size}/(\text{user data size} + \text{second intermediate ECC size})$$

The size of the first intermediate ECC 821 (first size) is twice the size of the second intermediate ECC 822 (second size). Therefore, the second coding rate is higher than the first coding rate. Therefore, in the coding example shown in FIG. 18, by reducing the size of the data assigned to one symbol, the coding rate can be improved as compared with the coding example shown in FIG. 17. Therefore, when the second intermediate ECC 822 is written into the save block, the ratio of ECC in the data stored in the non-volatile memory 5 can be lowered as compared with the case where the first intermediate ECC 821 is written into the save block.

(Reduction of the Amounts of the Padding Data and SB ECC that are Written into the Save Block)

Next, (B) the method for reducing the amounts of the padding data and SB ECC that are written into the save block will be described. The controller 4 and the non-volatile memory 5 have a function of writing (more specifically, programming) data into a block in a third data unit smaller than the second data unit. The second data unit is, for example, a page unit. The third data unit is, for example, a cluster unit. The function of writing data of cluster units into the non-volatile memory 5 is also referred to as a Partial Page Program function. The function of writing data of page units into the non-volatile memory 5 is also referred to as a Single Page Program function.

The controller 4 writes the user data stored in the buffer 15 into the save block in the third data unit smaller than the second data unit in response to the internal state determination request. By writing the user data into the save block in the third data unit, the amount of padding data written into the save block can be reduced as compared with the case where the user data is written into the save block in the second data unit.

Further, the controller 4 generates SB ECC for the user data so as to protect the user data in the third data unit. Then, the controller 4 writes the generated SB ECC into the save block in the third data unit. By generating SB ECC that protects user data in the third data unit, the amount of SB ECC written into the save block can be reduced as compared with the case of generating SB ECC that has the same remedy capability and protects user data in the second data unit.

Here, the Single Page Program function and the Partial Page Program function will be described with examples.

FIG. 19A is a diagram showing an example of data written in page units by the Single Page Program function and FIG. 19B is a diagram showing an example of data written in cluster units by the Partial Page Program function in the memory system 3 according to the embodiment. Here, it is assumed that the page unit (second data unit) is 16 KiB and the cluster unit (third data unit) is 4 KiB.

As shown in FIG. 19A, when data is written into the erased 16 KiB page 91 by the Single Page Program function, the 16 KiB data 91D is written (programmed) into the 16 KiB page 91 in one program operation. In this way, when the Single Page Program function is used, data can be written in 16 KiB units into the 16 KiB page 91.

On the other hand, as shown in FIG. 19B, when data is written into the erased 16 KiB page 92 by the Partial Page Program function, four 4 KiB data are written into the 16 KiB page 92 sequentially by the program operation four times. Specifically, for example, by the first program operation for the page 92, the 4 KiB data 921D is written in the head 4 KiB area in the page 92. The second program operation for the page 92 writes 4 KiB data 922D in the subsequent 4 KiB area in the page 92. By the third program operation for the page 92, the 4 KiB data 923D is written in the subsequent 4 KiB area in the page 92. Then, by the fourth program operation for the page 92, the 4 KiB data 924D is written in the subsequent 4 KiB area (that is, the terminal 4 KiB area) in the page 92. In this way, when the Partial Page Program function is used, data can be written in 4 KiB units into the 16 KiB page 92. Another access operation (e.g., a read operation to another page, a program operation to another block, or an erasing operation to another block) can be executed between the Partial Page Program and the subsequent Partial Page Program.

Figure 20:
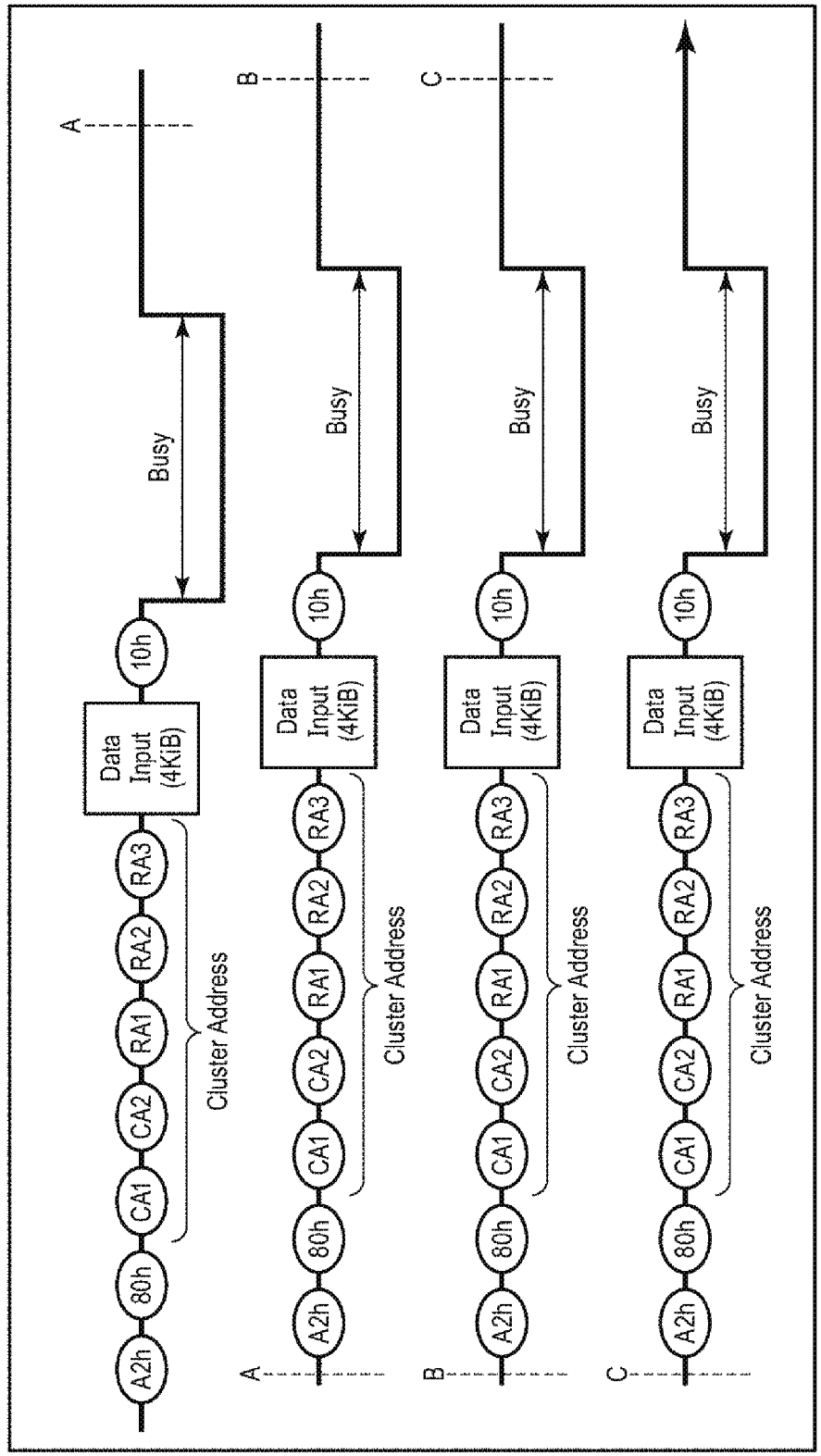
FIG. 20 is a diagram showing an example of a sequence of write operations for one page using the Partial Page Program function.

FIG. 20 is a diagram showing an example of a sequence of write operations for one page using the Partial Page Program function in the memory system 3 according to the embodiment. In the following, one page to be written is also referred to as a target page. The target page is an erased page. Further, the non-volatile memory chip provided with the target page is also referred to as a target memory chip.

First, the memory I/F 13 sends an SLC write instruction command "A2h", serial input commands "80h", a cluster address "CA1", "CA2", "RA1", "RA2", and "RA3", 4 KiB data to be written, and the program start command "10h" to the target memory chip to perform the first program operation for the target page. The cluster address is an address that specifies the cluster in the target page in which the program operation is to be executed. Then, the memory I/F 13 waits for the completion of the first program operation while the target memory chip is maintained in the busy state. That is, the first program operation is executed while the target memory chip is maintained in the busy state.

Timing A shown in FIG. 20 indicates the timing after the busy state of the target memory chip due to the first program operation for the target page ends (that is, the timing after the target memory chip transitions to the ready state). After the timing A, the memory I/F 13 sends the SLC write instruction command "A2h", the serial input command "80h", cluster addresses "CA1", "CA2", "RA1", "RA2", and "RA3", 4 KiB data to be written, and the program start command "10h" to the target memory chip to perform the second program operation for the target page. Then, the memory I/F 13 waits for the completion of the second program operation while the target memory chip is maintained in the busy state. That is, the second program operation is executed while the target memory chip is maintained in the busy state.

Timing B indicates the timing after the busy state of the target memory chip due to the second program operation for the target page ends. After the timing B, the memory I/F 13 sends the SLC write instruction command "A2h", the serial input command "80h", the cluster addresses "CA1", "CA2", "RA1", "RA2", and "RA3", 4 KiB data to be written, and the program start command "10h" to the target memory chip to perform the third program operation for the target page. Then, the memory I/F 13 waits for the completion of the third program operation while the target memory chip is maintained in the busy state. That is, the third program operation is executed while the target memory chip is maintained in the busy state.

Timing C indicates the timing after the busy state of the target memory chip due to the third program operation for the target page ends. After the timing C, the memory I/F 13 sends the SLC write instruction command "A2h", the serial input command "80h", the cluster addresses "CA1", "CA2", "RA1", "RA2", and "RA3", 4 KiB data to be written, and the program start command "10h" to the target memory chip to perform the fourth program operation for the target page. Then, the memory I/F 13 waits for the completion of the fourth program operation while the target memory chip is maintained in the busy state. That is, the fourth program operation is executed while the target memory chip is maintained in the busy state.

By executing the sequence shown in FIG. 20 above, the program operation for the target page is performed four times using the Partial Page Program function, so that four 4 KiB data (data of four clusters units) can be written into the target page. Although not shown in FIG. 20, as described above, another access may be executed between the Partial Page Program and the subsequent Partial Page Program (that is, timings A, B, and C).

Figure 21:
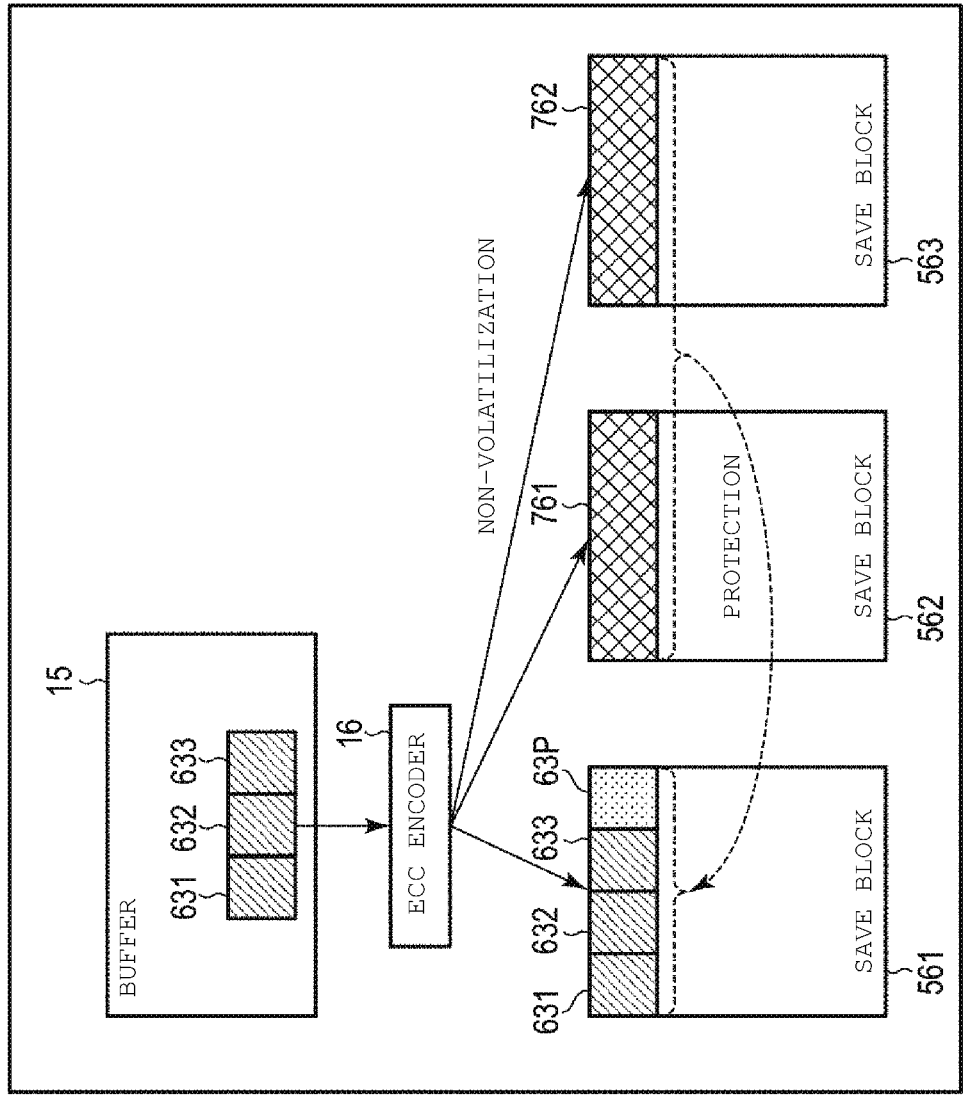
FIG. 21 is a diagram showing an example of user data written into the save block in a second data unit and an SB ECC that protects the user data in the second data unit.
Figure 22:
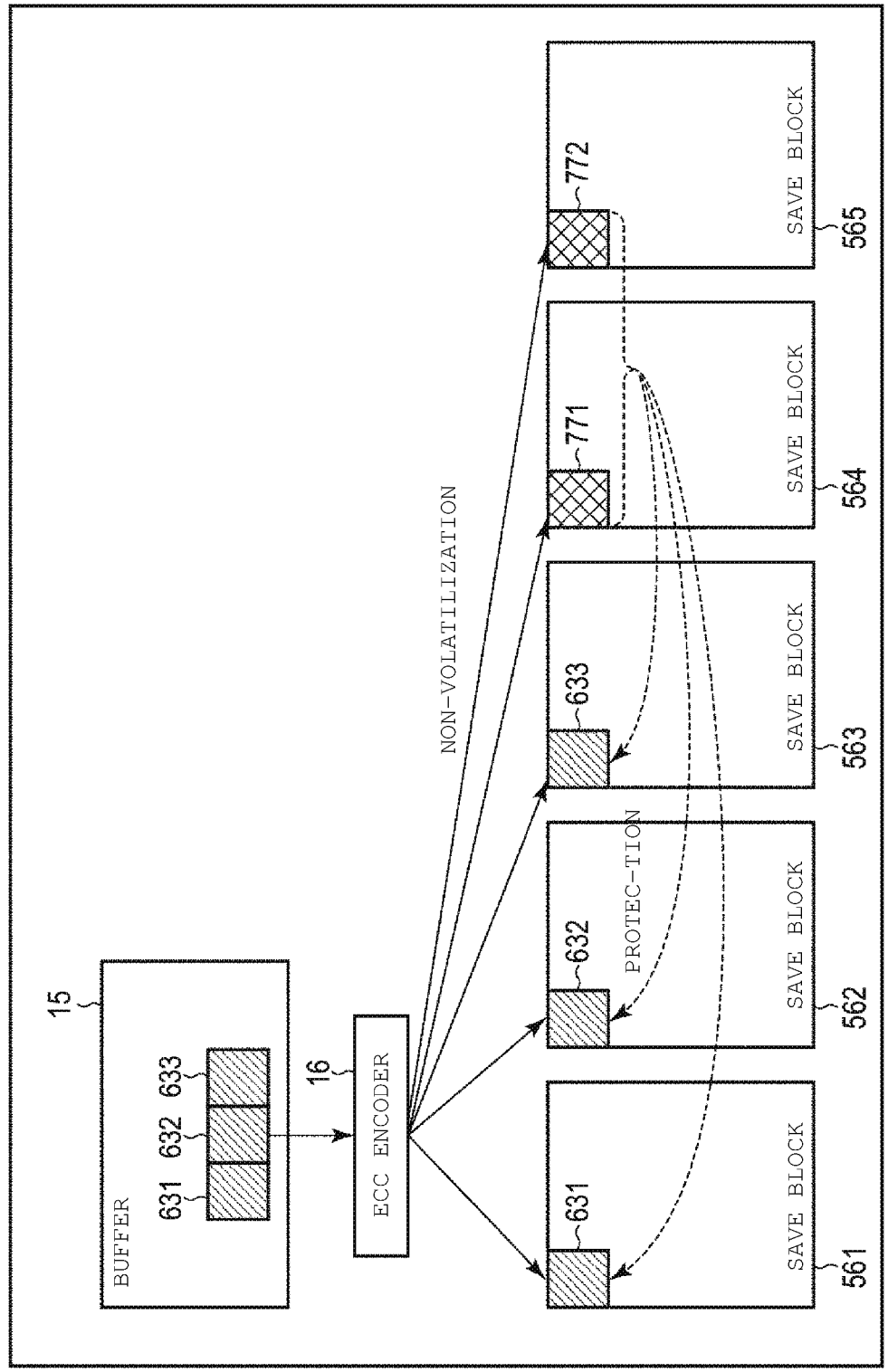
FIG. 22 is a diagram showing an example of user data written into the save block in a third data unit and an SB ECC that protects the user data in the third data unit.

With reference to FIGS. 21 and 22, (1) the case where the user data is written and protected in the second data unit, and (2) the case where the user data is written and protected in the third data unit will be described, respectively. Here, it is assumed that the SB ECC has a remedy capability of the loss of two blocks in either of the two cases.

(When Writing and Protecting User Data in the Second Data Unit)

FIG. 21 shows an example of user data written into the save block in the second data unit and the SB ECC that protects the user data in the second data unit. In the example shown in FIG. 21, the unit of data written in one write operation into one block is the second data unit. User data 631, 632, and 633 are stored in the buffer 15. The total data size of the user data 631, 632, and 633 does not reach the second data unit. The size of each of the user data 631, 632, and 633 corresponds to the third data unit. The three save blocks 561, 562, and 563 are blocks in the non-volatile memory 5.

In response to the internal state determination request, the user data 631, 632, and 633 and the padding data 63P are encoded by the ECC encoder 16 to generate the SB ECCs 761 and 762. The total data size of the user data 631, 632, and 633 and the padding data 63P corresponds to the second data unit. The SB ECCs 761 and 762 protect data in the second data unit and has the remedy capability of the loss of two blocks. Therefore, the SB ECCs 761 and 762 have twice the size of the second data unit.

Then, the user data 631, 632, and 633, the padding data 63P, and the SB ECCs 761 and 762 are written in sequence into the plurality of save blocks 561, 562, and 563 in the second data unit. Specifically, the user data 631, 632, and 633 and the padding data 63P are written into the save block 561. The SB ECC 761 is written into the save block 532. Then, the SB ECC 762 is written into the save block 533.

As a result, the user data 631, 632, and 633 and the padding data 63P are made non-volatile and protected by the SB ECCs 761 and 762. That is, the user data 631, 632, and 633, the padding data 63P, and the SB ECCs 761 and 762 configure one ECC frame.

(When Writing and Protecting User Data in the Third Data Unit)

FIG. 22 shows an example of user data written into the save block in the third data unit and the SB ECC that protects the user data in the third data unit in the memory system 3 according to the embodiment. In the example shown in FIG. 22, the unit of data written in one write operation into one block is the third data unit. User data 631, 632, and 633 are stored in the buffer 15. The size of each of the user data 631, 632, and 633 corresponds to the third data unit. The five save blocks 561, 562, 563, 564, and 565 are blocks in the non-volatile memory 5.

The controller 4 encodes the user data 631, 632, and 633 with the ECC encoder 16 in response to the internal state determination request, and generates the SB ECCs 771 and 772. The SB ECCs 761 and 762 protects data in the third data unit and has a remedy capability of the loss of two blocks. Therefore, the SB ECCs 771 and 772 have twice the size of the third data unit.

Then, the controller 4 writes the user data 631, 632, and 633 and the SB ECCs 771 and 772 in sequence into the five save blocks 561, 562, 563, 564, and 565 in the third data unit. Specifically, the controller 4 writes the user data 631 into the save block 561. The controller 4 writes the user data 632 into the save block 562. The controller 4 writes the user data 633 into the save block 563. The controller 4 writes the SB ECC 771 to the save block 564. Then, the controller 4 writes the SB ECC 772 into the save block 565.

As a result, the controller 4 makes the user data 631, 632, and 633 non-volatile and protects them with the SB ECCs 771 and 772. That is, the user data 631, 632, and 633 and the SB ECCs 771 and 772 configure one ECC frame.

As described above, in the memory system 3 of the present embodiment, the controller 4 writes each of the user data 631, 632, and 633 stored in the buffer 15 into each of the save blocks 561, 562, and 563 in the third data unit smaller than the second data unit in response to the internal state determination request. By writing the user data into the save block in the third data unit, the controller 4 can reduce the amount of padding data written into the save block as compared with the case where the user data is written into the save block in the second data unit.

Further, the controller 4 generates the SB ECC 771 and 772 for the user data 631, 632, and 633 so as to protect the user data 631, 632, and 633 in the third data unit. Then, the controller 4 writes the generated SB ECCs 771 and 772 into the save blocks 564 and 565 in the third data unit. By generating the SB ECC that protects user data in the third data unit, the amount of SB ECC written into save blocks can be reduced as compared with the case of generating the SB ECC that has the same remedy capability and protects user data in the second data unit. Therefore, when the SB ECC that protects the user data in the third data unit is written into the save block, it is possible to reduce the ratio of ECC in the data stored in the non-volatile memory 5 as compared with the case of writing the SB ECC that protects the user data into save blocks in the second data unit.

Here, the case where the second data unit is 16 KiB and the third data unit is 4 KiB will be illustrated. In this case, the total data size of the SB ECCs 761 and 762 shown in FIG. 21 is 32 KiB. On the other hand, the total data size of the SB ECCs 771 and 772 shown in FIG. 22 is 8 KiB. Therefore, by changing the protection unit of the user data 631, 632, and 633 from 16 KiB to 4. KiB, the size of the SB ECC written into the save block to protect the user data 631, 632, and 633 can be reduced to ¼ at the maximum.

Next, some operation examples performed in the memory system 3 will be described with reference to FIGS. 23 to 25.

Figure 23:
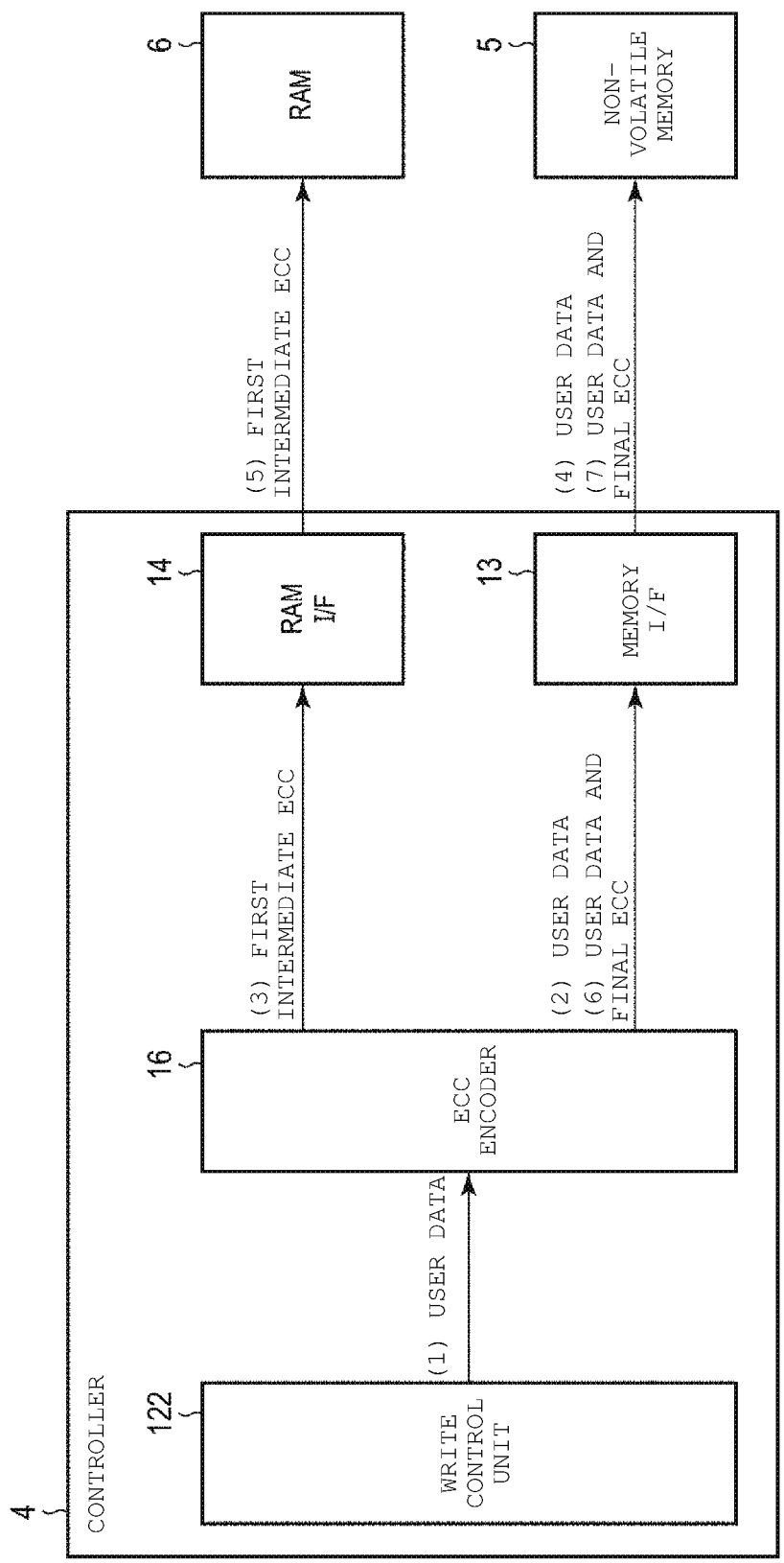
FIG. 23 is a diagram showing an example of a write operation performed in a memory system according to an embodiment.

FIG. 23 shows an example of a write operation performed in the memory system 3 according to the embodiment. The write operation is an operation for writing the unwritten user data stored in the buffer 15 into the write destination block. In the buffer 15, for example, the user data to be written received from the host 2 according to the reception of the write command is stored. The buffer 15 may store valid data copied from the GC source block.

The write control unit 122 transfers the user data to be written into the non-volatile memory 5 from the buffer 15 to the ECC encoder 16 ((1) in FIG. 23).

The ECC encoder 16 encodes the user data and generates an ECC to be included in an ECC frame together with the user data. The ECC encoder 16 generates either an intermediate ECC for protecting user data in a first protection unit or a final ECC for protecting the user data in the second protection unit. When user data of the second protection unit size is written into the d write destination blocks, the user data of the second protection unit includes user data portions of the d−1 first protection units.

More specifically, the ECC encoder 16 encodes the user data portion of the first protection unit size to generate the first intermediate ECC. The user data portion of the first protection unit and the first intermediate ECC configure an ECC frame having the first frame size. The ECC encoder 16 transfers the user data portion of the first protection unit to the memory I/F 13 ((2) in FIG. 23). The ECC encoder 16 also transmits the generated first intermediate ECC to the RAM I/F 14 ((3) in FIG. 23).

The memory I/F 13 writes the user data portion of the first protection unit size (transferred by the ECC encoder 16) into the non-volatile memory 5 ((4) in FIG. 23). More specifically, the memory I/F 13 writes the user data portion of the first protection unit size into one of the d write destination blocks.

The RAM I/F 14 stores the first intermediate ECC in the RAM 6 ((5) in FIG. 23). As a result, the user data portion of the first protection unit size is protected by the corresponding first intermediate ECC (in RAM 6).

The write control unit 122 updates the logical-to-physical address conversion table 31 so as to show the mapping between the physical address and the logical address of the written user data portion of the first protection unit size. The write control unit 122 also updates the data address-intermediate ECC address correspondence table 32 so as to indicate the correspondence between the written physical address of the user data portion of the first protection unit size and the physical address of the first intermediate ECC stored in the RAM 6.

Further, when the (d−1) user data portions of first protection unit size in each of the corresponding (d−1) ECC frames of the first frame size are written into the non-volatile memory 5, the ECC encoder 16 encodes these (d−1) user data portions of the first protection unit size along with a second user data portion to be written into the non-volatile memory 5 to generate the final ECC. The (d−1) user data portions of the first protection unit size, the second user data portion, and the final ECC configure an ECC frame having a second frame size. The second frame size is larger than the first frame size. The combined (d−1) user data portions of first protection unit size and the second user data portion is user data of the second protection unit size. The ECC encoder 16 transfers the second user data portion and the generated final ECC to the memory I/F 13 ((6) in FIG. 23).

The memory I/F 13 writes the second user data portion (transferred by the ECC encoder 16) and the final ECC into the non-volatile memory 5 ((7) in FIG. 23). More specifically, the memory I/F 13 writes the second user data portion and the final ECC into the last write destination block among the total of d write destination blocks. As a result, the user data of the second protection unit size ((d−1) first protection unit sized portions+the size of the second user data portion), is protected by the corresponding final ECC.

After writing the second user data portion together with the final ECC into the non-volatile memory 5, the write control unit 122 updates the logical-to-physical address conversion table 31 so as to indicate the mapping between the physical address and the logical address of the just written second user data portion. The write control unit 122 also invalidates the (d−1) intermediate ECCs. Specifically, the write control unit 122 specifies, for example, the physical address of each of the (d−1) user data portions of the first protection unit size in the ECC frame of the second frame size. The write control unit 122 updates the data address-intermediate ECC address correspondence table 32 so that the physical address of the specified user data portion is not associated with the physical address of any intermediate ECC. As a result, the (d−1) intermediate ECCs corresponding to the (d−1) user data portions of the first protection unit size are invalidated.

By the write operation shown in FIG. 23 above, the controller 4 can protect each user data portion of the first protection unit size with a first intermediate ECC. The controller 4 can also protect user data of a second protection unit size with one final ECC.

In the operation of (4) in FIG. 23, when writing (more specifically, programming) into the non-volatile memory 5 of at least a part of a user data portion of the first protection unit size fails, the error correction processing unit 124 will perform the error correction processing on this user data portion of the first protection unit size by using the first intermediate ECC corresponding to the user data portion. Erasure correction may be used for this error correction processing. That is, the error correction processing unit 124 restores the user data portion of the first protection unit size for which the writing failed by using the first intermediate ECC. As a result, the write control unit 122 can attempt to write into the write destination block again using the restored user data portion of the first protection unit size.

Figure 24:
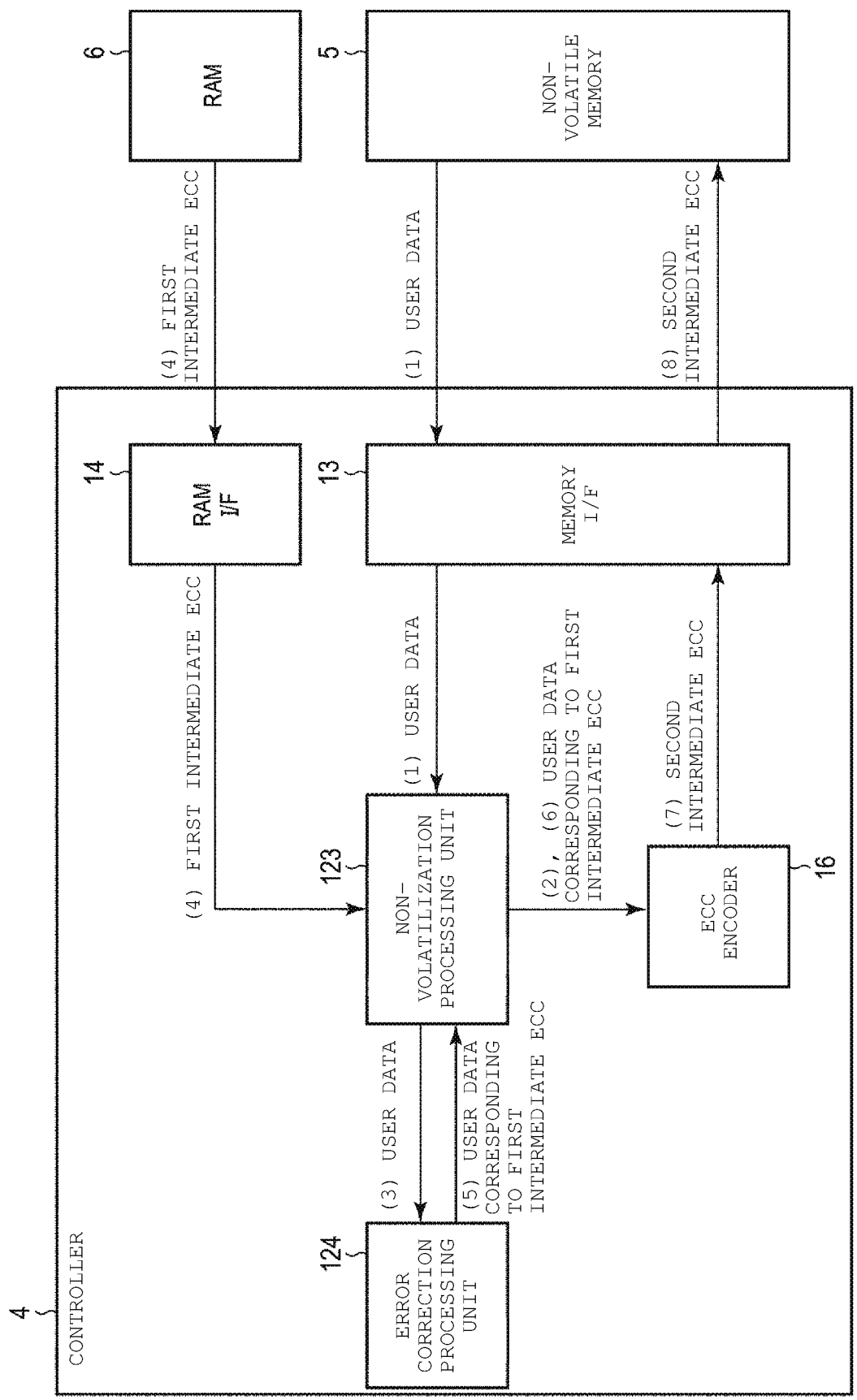
FIG. 24 is a diagram showing an example of a first non-volatilization operation performed in a memory system according to an embodiment.

FIG. 24 shows an example of a first non-volatilization operation performed in the memory system 3 according to the embodiment. The first non-volatilization operation is an operation for making the intermediate ECC non-volatile in response to the internal state determination request. Here, it is assumed that the first intermediate ECC for protecting a user data portion of the first protection unit size stored in a write destination block is presently stored in the RAM 6.

When the non-volatilization processing unit 123 receives the internal state determination request, the non-volatilization processing unit 123 performs read verification for the user data corresponding to the first intermediate ECC. Read verification is an operation for verifying the integrity of the data stored in the non-volatile memory 5. Specifically, the non-volatilization processing unit 123 reads the user data corresponding to the first intermediate ECC from the non-volatile memory 5 (more specifically, the write destination block) ((1) in FIG. 24). The non-volatilization processing unit 123 uses in-page ECC to correct errors in the read user data in this instance. If the error correction is successful, the non-volatilization processing unit 123 determines that the integrity of the user data is confirmed. If the error correction fails, the non-volatilization processing unit 123 determines that the integrity of the user data is not confirmed.

When the integrity of the user data is confirmed by the read verification, the non-volatilization processing unit 123 transfers the now-verified user data to the ECC encoder 16 ((2) in FIG. 24).

When the integrity of the user data is not confirmed in the read verification, the non-volatilization processing unit 123 sends the non-verified user data to the error correction processing unit 124 ((3) in FIG. 24). The error correction processing unit 124 acquires the corresponding first intermediate ECC from the RAM 6 via the RAM I/F 14 ((4) in FIG. 24). The error correction processing unit 124 performs error correction processing on the user data using the acquired first intermediate ECC. That is, the error correction processing unit 124 restores the user data by using the first intermediate ECC. The error correction processing unit 124 sends now error-corrected user data (that is, user data as corrected with the first intermediate ECC) to the non-volatilization processing unit 123 ((5) in FIG. 24). Then, the non-volatilization processing unit 123 transfers the error-corrected user data to the ECC encoder 16 ((6) in FIG. 24).

The ECC encoder 16 encodes the user data to generate the second intermediate ECC. The data size of the second intermediate ECC is smaller than the data size of the first intermediate ECC. That is, the coding rate used when the second intermediate ECC is generated from the user data is higher than the coding rate used when the first intermediate ECC is generated from the user data. The ECC encoder 16 transfers the generated second intermediate ECC to the memory I/F 13 ((7) in FIG. 24).

The memory I/F 13 writes the second intermediate ECC into the non-volatile memory 5 ((8) in FIG. 24). More specifically, the memory I/F 13 writes the second intermediate ECC into a save block.

The non-volatilization processing unit 123 updates the data address-intermediate ECC address correspondence table 32 so as to indicate a correspondence between the physical address of the user data stored in the non-volatile memory 5 and the physical address of the second intermediate ECC now written into the non-volatile memory 5.

By the above first non-volatilization operation, the controller 4 can protect the user data portion of the first protection unit size with a non-volatile second intermediate ECC (that is, with an ECC stored in the non-volatile memory 5 instead of with an ECC stored in the RAM 6).

Figure 25:
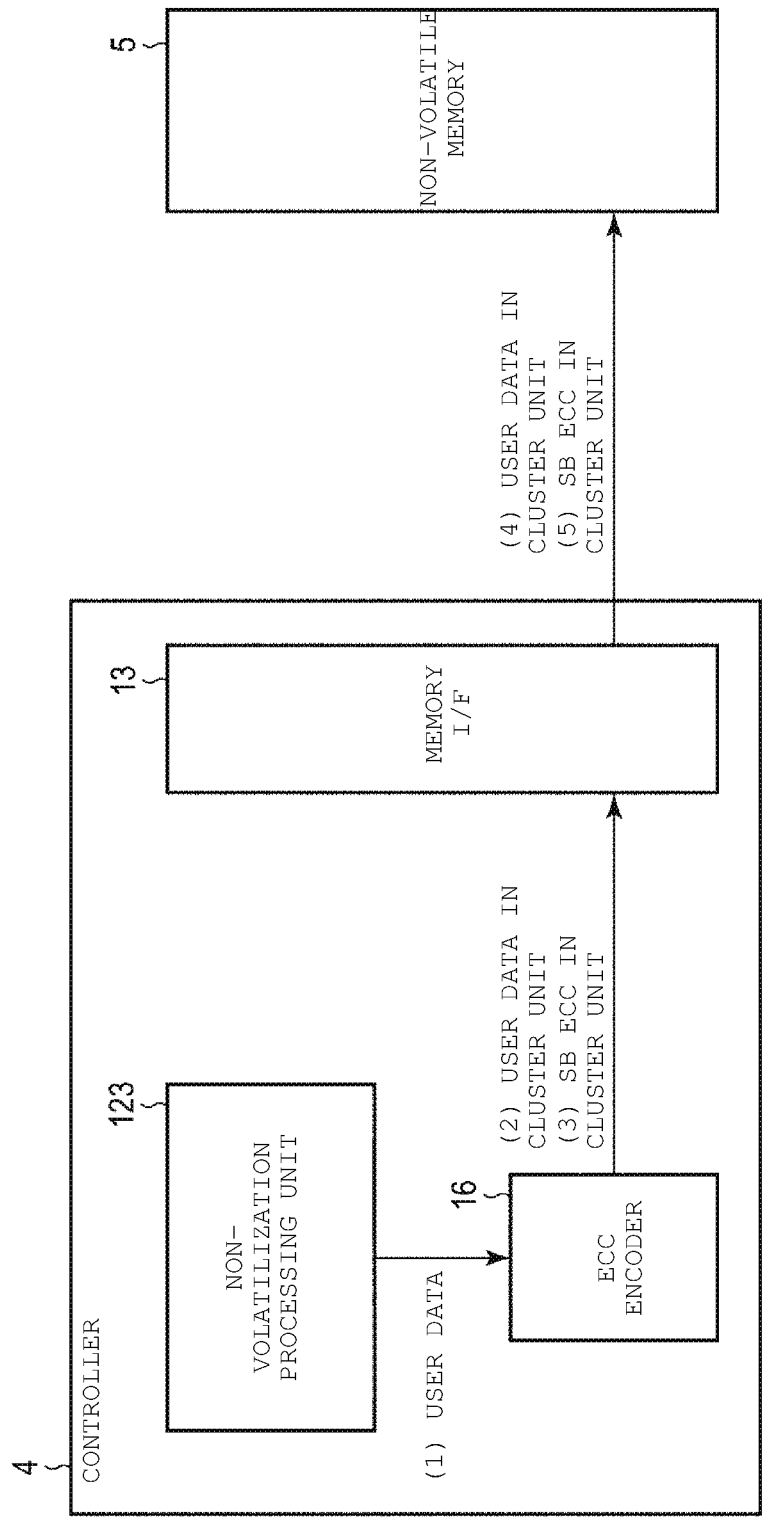
FIG. 25 is a diagram showing an example of a second non-volatilization operation performed in a memory system according to an embodiment.

FIG. 25 shows an example of a second non-volatilization operation performed in the memory system 3 according to the embodiment. The second non-volatilization operation is an operation for making the presently unwritten user data stored in the buffer 15 and its corresponding SB ECC non-volatile in response to the internal state determination request. In this example, a case where the third data unit for writing and protecting user data is a cluster unit will be illustrated.

When the non-volatilization processing unit 123 receives the internal state determination request, the non-volatilization processing unit 123 divides the unwritten user data presently stored in the buffer 15 and thus acquires a total of b cluster units of user data, where b is an integer of 1 or greater. When the non-volatilization processing unit 123 divides the unwritten user data into cluster units, the non-volatilization processing unit 123 adds padding data as necessary to the acquired user data to obtain only full cluster units. The non-volatilization processing unit 123 sends the acquired b cluster units of user data to the ECC encoder 16 ((1) in FIG. 25).

The ECC encoder 16 encodes the b cluster units and generates a total of c SB ECC in cluster units, where the value of c is based on the number (e.g., 2) of the b cluster units whose loss is corrected by a single SB ECC. The ECC encoder 16 transfers each of the b cluster units of user data to the memory I/F 13 ((2) in FIG. 25). The ECC encoder 16 also transfers each of the c SB ECC in cluster units to the memory I/F 13 ((3) in FIG. 25).

The memory I/F 13 writes the user data clusters (cluster units) transferred by the ECC encoder 16 into the non-volatile memory 5 ((4) in FIG. 25). More specifically, the memory I/F 13 writes each of the b cluster-sized portions of user data into a total of b save blocks in turn. The memory I/F 13 also writes the cluster-sized SB ECCs transferred by the ECC encoder 16 into the non-volatile memory 5 ((5) in FIG. 25). More specifically, the memory I/F 13 writes of the c SB ECCs into each of a total of c save blocks in turn. The save blocks used for the SB ECC clusters are different from the save blocks used for the user data clusters.

Next, the non-volatilization processing unit 123 updates the logical-to-physical address conversion table 31 so as to indicate the mapping between the physical address and the logical address of each of the written clusters of user data. The non-volatilization processing unit 123 also updates the data address-SB ECC address correspondence table 32 so as to indicate the correspondence between the physical addresses of each of the written user data clusters and the physical addresses of the written SB ECC clusters.

By the above second non-volatile operation, the controller 4 can make the previously unwritten user data of buffer 15 non-volatile. In addition, the user data (in a total b clusters) from the buffer can be protected by non-volatile SB ECCs (a total of c SB ECCs).

Next, an example of the procedure of the processing executed in the memory system 3 will be described with reference to the flowcharts of FIGS. 26 to 32.

Figure 26:
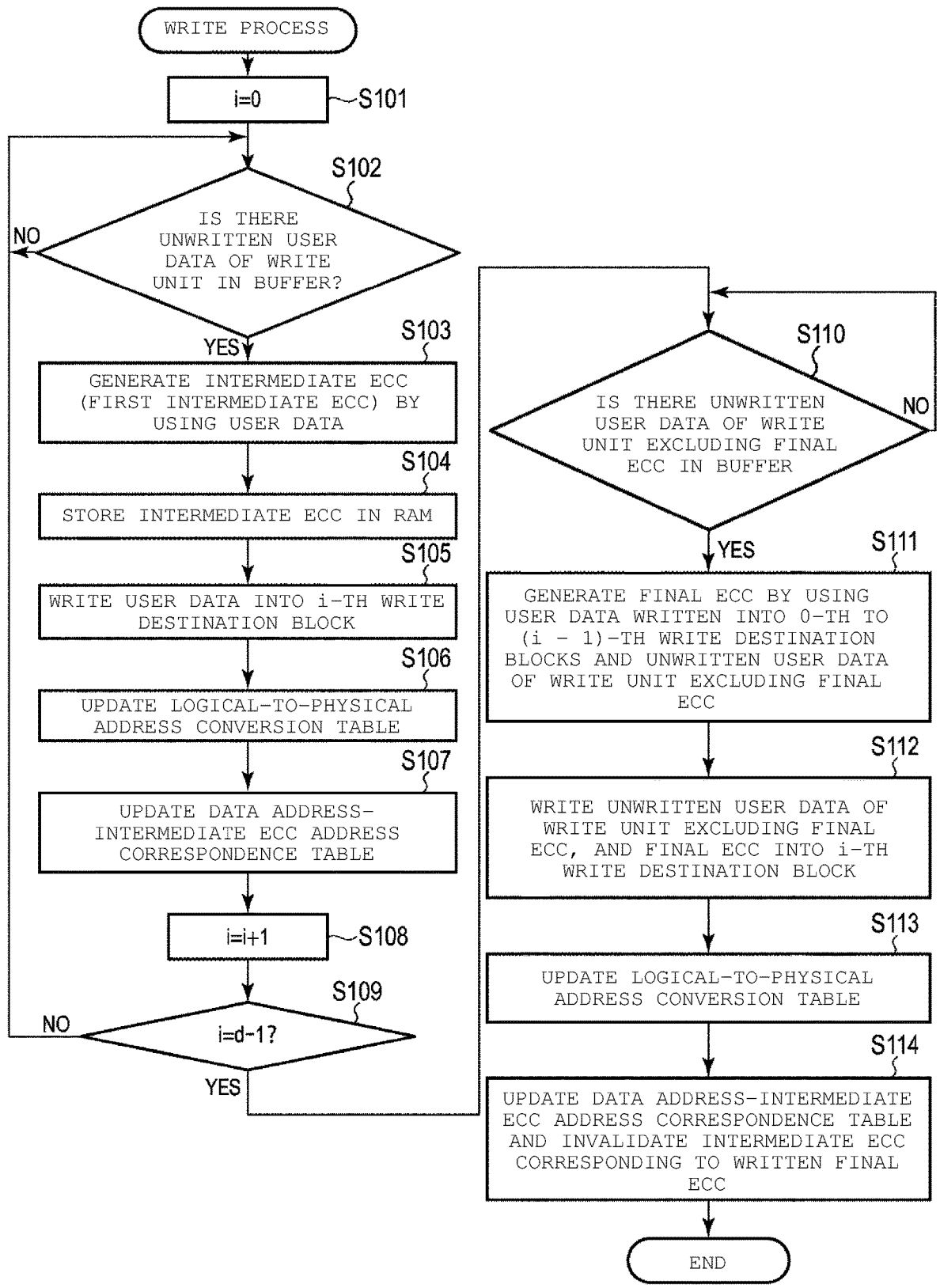
FIG. 26 is a flowchart of a write process executed by a write control unit in a controller in a memory system according to an embodiment.

FIG. 26 is a flowchart showing an example of the procedure of write process executed by the write control unit 122 in the controller 4 in the memory system 3 according to the embodiment. Here, an example is illustrated in which the write control unit 122 sequentially writes data having a size corresponding to a write unit into each of the d write destination blocks. That is, the data of the d write units are units protected by a final ECC, where d is an integer of 2 or greater. Although the write process performed according to the reception of the write command from the host 2 is illustrated, the same write process can be performed as part of an internal operation of the memory system 3 (for example, GC operation, refresh operation, wear leveling operation).

First, the write control unit 122 sets the variable i to 0 (S101).

Next, the write control unit 122 determines whether user data of a write unit size is stored in the buffer 15 without having yet been written to a write destination block (S102).

If user data of a write unit size is not yet stored in the buffer 15 (or has already been previously written) (S102, NO), the write control unit 122 repeats the procedure of S102.

When user data of a write unit size is stored in the buffer 15 (and has not yet been written to a write destination block) (S102, YES), the write control unit 122 encodes user data of a write unit size with the ECC encoder 16 to generate the first intermediate ECC (S103). The generated first intermediate ECC configures an ECC frame of the first frame size together with the user data of a write unit size. The write control unit 122 stores the generated first intermediate ECC in the RAM 6 (S104). The write control unit 122 writes the user data into the i-th write destination block (S105).

Next, the logical-to-physical address conversion table 31 is updated so as to indicate the mapping between the physical address and the logical address of the user data written into the i-th write destination block (S106). The write control unit 122 updates the data address-intermediate ECC address correspondence table 32 so as to indicate the correspondence between the physical address of the user data written into the i-th write destination block and the physical address of the corresponding first intermediate ECC stored in the RAM 6 (S107).

Next, the write control unit 122 adds 1 to the variable i (S108). The write control unit 122 then checks whether the variable i is equal to d−1 (S109). The value d is the maximum number of write units that may be written in a single write process. Therefore, in S109, the write control unit 122 is determining whether the next write unit processed will be a full write unit of user data or will be a write unit sized combination of user data and the final ECC.

When the variable i is not equal to (d−1) (S109, NO), the write control unit 122 returns to the procedure of S102. That is, assuming user data to be written remains in the buffer 15, the write control unit 122 generates and stores the first intermediate ECC for the user data of another write unit in the RAM 6, and then returns to the procedure of S102 until variable i becomes equal to (d−1).

When the variable i is equal to (d−1) (S109, YES), the write control unit 122 next determines whether any unwritten user data of is stored in the buffer 15 (S110). The write unit size in this context is the normal write unit size minus the size of the final ECC portion. If user data of the required size (referred to as modified write unit size) is not presently stored in the buffer 15 (S110, NO), the write control unit 122 returns to the procedure of S110.

If user data of the required size is in the buffer 15 (S110, YES), the write control unit 122 encodes the user data of the (normal) write unit size written into each of the write destination blocks (0th to (i−1)th blocks) and also the user data of the modified write unit size in the buffer 15 with the ECC encoder 16 to generate the final ECC (S111). The write control unit 122 next writes the user data of the modified write unit size and the generated final ECC into the i-th write destination block (S112). The final ECC configures an ECC frame having the second frame size together with the user data written into each of the 0th to the (i−1)th write destination blocks and the user data of the modified write unit size written into the i-th write destination block.

Next, the write control unit 122 updates the logical-to-physical address conversion table 31 so as to indicate the mapping between the physical address and the logical address of the user data written into the i-th write destination block (S113). Then, the write control unit 122 updates the data address-intermediate ECC address correspondence table 32, invalidates all the intermediate ECCs corresponding to the written final ECCs (S114), and ends the write process (end). That is, since the final ECC corresponding to the ECC frame of the second frame size is written into the i-th write destination block, the write control unit 122 invalidates the intermediate ECC generated for the user data in the ECC frame of the second frame size. More specifically, the write control unit 122 invalidates the intermediate ECC by deleting the entry corresponding to the intermediate ECC to be invalidated from the data address-intermediate ECC address correspondence table 32. The intermediate ECC to be invalidated is at least one of the first intermediate ECC and the second intermediate ECC.

By the write process shown in FIG. 26 above, the write control unit 122 can protect the d user data stored in the d write destination blocks by the final ECC. The write control unit 122 can also protect the user data of the normal write unit size written into each of the (d−1) write destination blocks using the corresponding intermediate ECC from the time when the user data of the write unit is written into each of the (d−1) write destination blocks until the corresponding final ECC is written.

The write process procedure in the GC is the same as the write process procedure by the write control unit 122. Specifically, in the write process procedure in GC, in the write process procedure shown in FIG. 26, though in this context the user data stored in the buffer 15 may be considered replaced with valid data stored in the buffer 15. The valid data stored in the buffer 15 is data copied from a GC source block.

Figure 27:
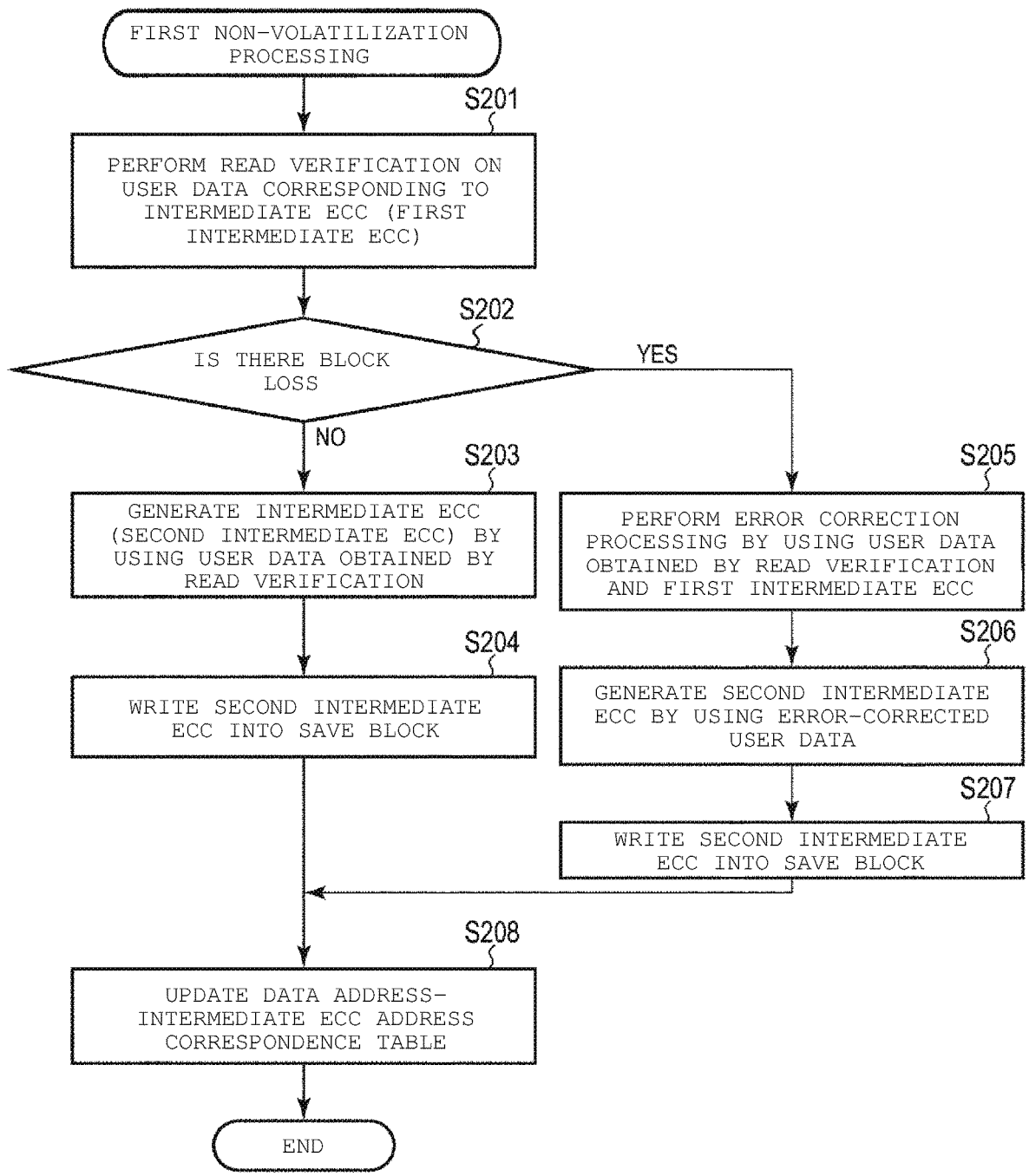
FIG. 27 is a flowchart of a first non-volatilization processing executed by a non-volatilization processing unit and an error correction processing unit in a controller in a memory system according to an embodiment.

FIG. 27 is a flowchart showing an example of the procedure of the first non-volatilization processing executed by the non-volatilization processing unit 123 and the error correction processing unit 124 in the controller 4 in the memory system 3 according to the embodiment. The non-volatilization processing unit 123 and the error correction processing unit 124 execute the first non-volatilization processing when the non-volatilization of the intermediate ECC is requested in response to the internal state determination request. Here, it is assumed that the intermediate ECC (first intermediate ECC) is stored in the RAM 6. The first intermediate ECC corresponds to the user data stored in a write destination block of the non-volatile memory 5.

First, the non-volatilization processing unit 123 performs read verification on the user data corresponding to the first intermediate ECC (S201). Then, the non-volatilization processing unit 123 determines whether block loss is detected in read verification (S202). For example, the non-volatilization processing unit 123 determines whether there is a block whose data integrity is not confirmed in the read verification.

When block loss is not detected (S202, NO), the non-volatilization processing unit 123 encodes the user data obtained by the read verification with the ECC encoder 16 to generate an intermediate ECC (second intermediate ECC) which is smaller than the first intermediate ECC (S203). The non-volatilization processing unit 123 writes the generated second intermediate ECC into the save block (S204) and proceeds to the procedure of S208.

When block loss is detected (S202, YES), the error correction processing unit 124 performs error correction processing using the user data obtained by the read verification and the first intermediate ECC (S205). The non-volatilization processing unit 123 then generates the second intermediate ECC using the error-corrected user data (S206). Next, the non-volatilization processing unit 123 writes the generated second intermediate ECC into the save block (S207) and proceeds to the procedure of S208. In some examples, the non-volatilization processing unit 123 may check whether a block loss exceeding the remedy capability of the second intermediate ECC (that is, the second size intermediate ECC) is not detected in the read verification. For example, when the second intermediate ECC has a remedy capability capable of relieving the loss of one block, the non-volatilization processing unit 123 confirms that the is not a loss of two or more blocks detected in the read verification. The non-volatilization processing unit 123 generates the second intermediate ECC if block loss exceeding the remedy capability of the second intermediate ECC is not detected. That is, in the read verification, the non-volatilization processing unit 123 generates the second intermediate ECC when no block loss occurs in the read user data and when a block loss that can be corrected by the second intermediate ECC occurs in the read user data. As a result, the non-volatilization processing unit 123 can guarantee that the second intermediate ECC is generated for the user data in which there is no block loss exceeding the remedy capability of the second intermediate ECC.

Next, the non-volatilization processing unit 123 updates data address-intermediate ECC address correspondence table 32 to indicate a correspondence between the physical address of the user data stored in the write destination block and the physical address of the second intermediate ECC written into the save block (S208) and ends the first non-volatilization processing (end).

By the first non-volatilization processing shown in FIG. 27 above, the non-volatilization processing unit 123 and the error correction processing unit 124 can write a second intermediate ECC having a smaller size than the first intermediate ECC (stored in the RAM 6) into a save block when the non-volatilization of the intermediate ECC is requested. The user data protected by the first intermediate ECC can then be protected by the second intermediate ECC after the second intermediate ECC is written into the save block.

When block loss is detected in S202, the error correction processing unit 124 may perform error correction processing using the user data obtained by the read verification and the first intermediate ECC in S205, and then a refresh process may be performed on the block in which the block loss occurred. The refresh process is a process of copying the data stored in the block in which the block loss occurred to another block in which block loss did not occur.

Figure 28:
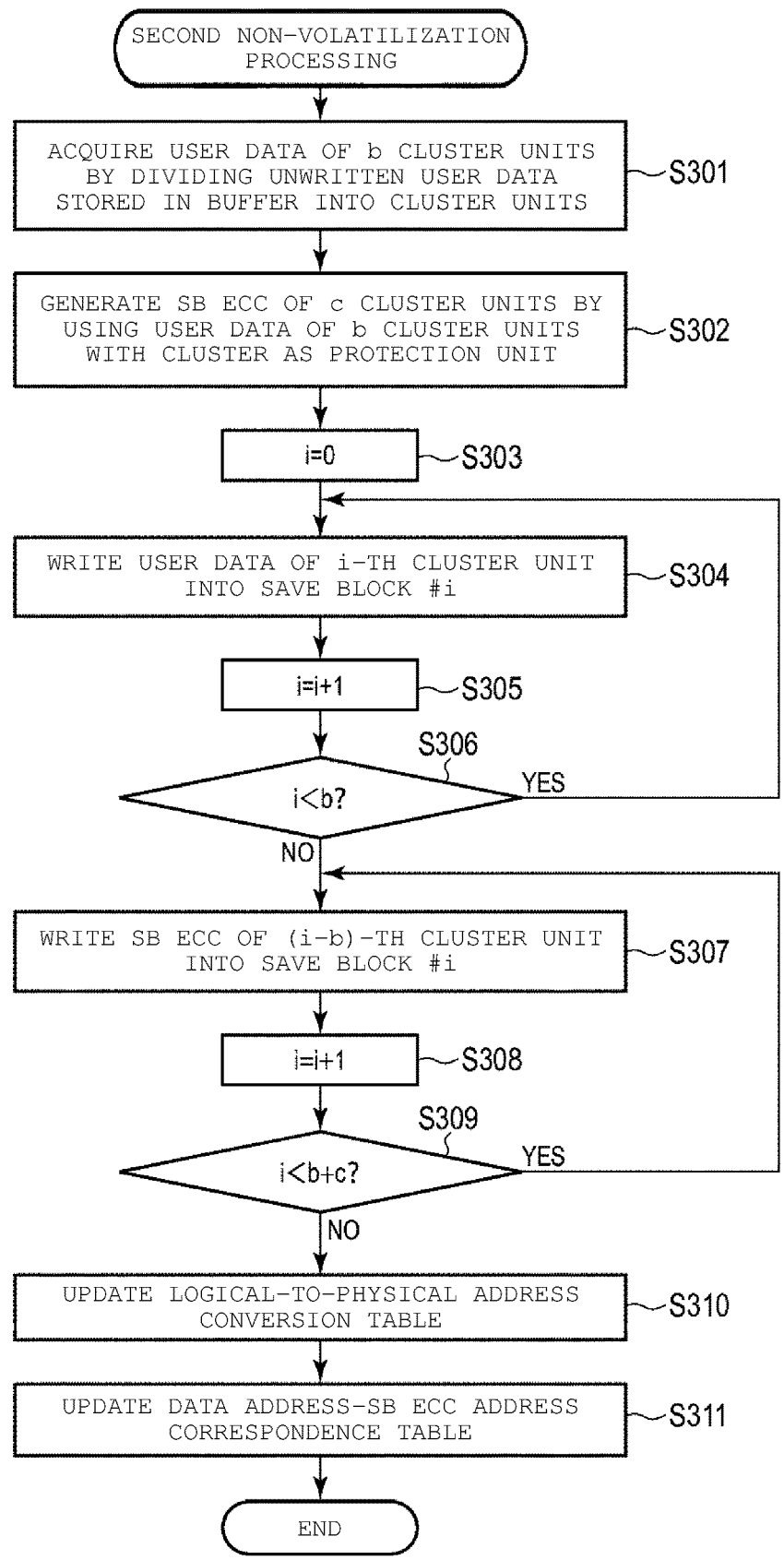
FIG. 28 is a flowchart of second non-volatilization processing executed by a non-volatilization processing unit in a controller in a memory system according to an embodiment.

FIG. 28 is a flowchart showing an example of a procedure of the second non-volatilization processing executed by the non-volatilization processing unit 123 in the controller 4 in the memory system 3 according to the embodiment. The non-volatilization processing unit 123 executes the second non-volatilization processing when the non-volatilization of the unwritten user data stored in the buffer 15 is requested in response to the internal state determination request. Here, a case where the third data unit of writing and protecting the user data stored in the buffer 15 is a cluster unit size will be illustrated.

First, the non-volatilization processing unit 123 divides the unwritten user data in the buffer 15 into cluster units and thereby obtains b groups of cluster-based user data (S301), where b is an integer of 1 or greater. Each of the b cluster-based user data can also be referred to as a x-th cluster unit user data, where x is an integer from 0 to (b−1). If user data less than a whole cluster unit in size (a remainder) is obtained when the user data is divided into cluster units, the non-volatilization processing unit 123 adds padding data to the remainder user data to obtain a whole cluster unit of data including the remainder user data.

The non-volatilization processing unit 123 encodes user data in the b cluster units with the ECC encoder 16 with each cluster as a protection unit and generates a total of c SB ECCs in cluster units (S302), where the value of c is based on the number (e.g., 2) of b cluster units whose loss is correctable by one SB ECC. Each of the SB ECCs of can also be referred to as a y-th cluster unit SB ECC, where y is an integer from 0 to (c−1).

Next, the non-volatilization processing unit 123 writes the b cluster units of user data and the c cluster units of SB ECCC into a total of (b+c) save blocks according to the procedures from S303 to S309. In the following, each of the (b+c) save blocks are referred to as a save block #z, where z is an integer from 0 to (b+c−1).

Specifically, the non-volatilization processing unit 123 sets the variable i to 0 (S303). The non-volatilization processing unit 123 writes the user data of the i-th cluster unit into the save block #i (S304). The non-volatilization processing unit 123 adds 1 to the variable i (S305). Then, the non-volatilization processing unit 123 determines whether the variable i is less than b (S306). When the variable i is less than b (S306, YES), the non-volatilization processing unit 123 returns to S304. That is, the non-volatilization processing unit 123 further performs a process for writing the user data of another one of the cluster units into a save block.

When the variable i is greater than or equal to b (S306, NO), the non-volatilization processing unit 123 writes the SB ECC of the (i−b)th cluster unit into the save block #i (S307). The non-volatilization processing unit 123 adds 1 to the variable i (S308). Then, the non-volatilization processing unit 123 determines whether the variable i is less than (b+c) (S309). When the variable i is less than (b+c) (S309, YES), the non-volatilization processing unit 123 returns to S307. That is, the non-volatilization processing unit 123 further performs a process for writing the SB ECC of another cluster unit into a save block.

When the variable i is greater than or equal to (b+c) (S306, NO), the non-volatilization processing unit 123 updates the logical-to-physical address conversion table 31 so as to indicate the mapping of the physical address and the logical address of the user data of each cluster written into each of the save blocks #0 to #(b−1) (S310). Then, the non-volatilization processing unit 123 updates data address-SB ECC address correspondence table 33 so as to indicate the correspondence between the physical address of the user data of the cluster unit written into each of the save blocks #0 to #(b−1), and the physical address of the corresponding SB ECC written into each of the save blocks #b to #(b+c−1) (S311), and ends the second non-volatilization processing.

By the second non-volatilization processing shown in FIG. 28 above, the non-volatilization processing unit 123 can write user data as b cluster units (obtained by dividing the user data stored in the buffer 15) into each of the b save blocks. By writing the user data into a save block in cluster units, the padding amount can be reduced as compared with the case where the user data is written into save blocks that are a page unit in size, for example.

The non-volatilization processing unit 123 can also protect the user data of the b cluster units stored in the b save blocks with the SB ECCs of cluster unit size stored in c save blocks. By generating SB ECC for user data in cluster units, the size of SB ECC data generated can be reduced as compared with the case of generating SB ECC for user data in page units. Therefore, the amount of SB ECC written into a save block can be reduced.

The controller 4 executes the second non-volatilization processing after executing the first non-volatilization processing, for example. Furthermore, the controller 4 may execute the first non-volatilization processing after executing the second non-volatilization processing. Alternatively, the controller 4 may execute the first non-volatilization processing and the second non-volatilization processing in parallel.

Figure 29:
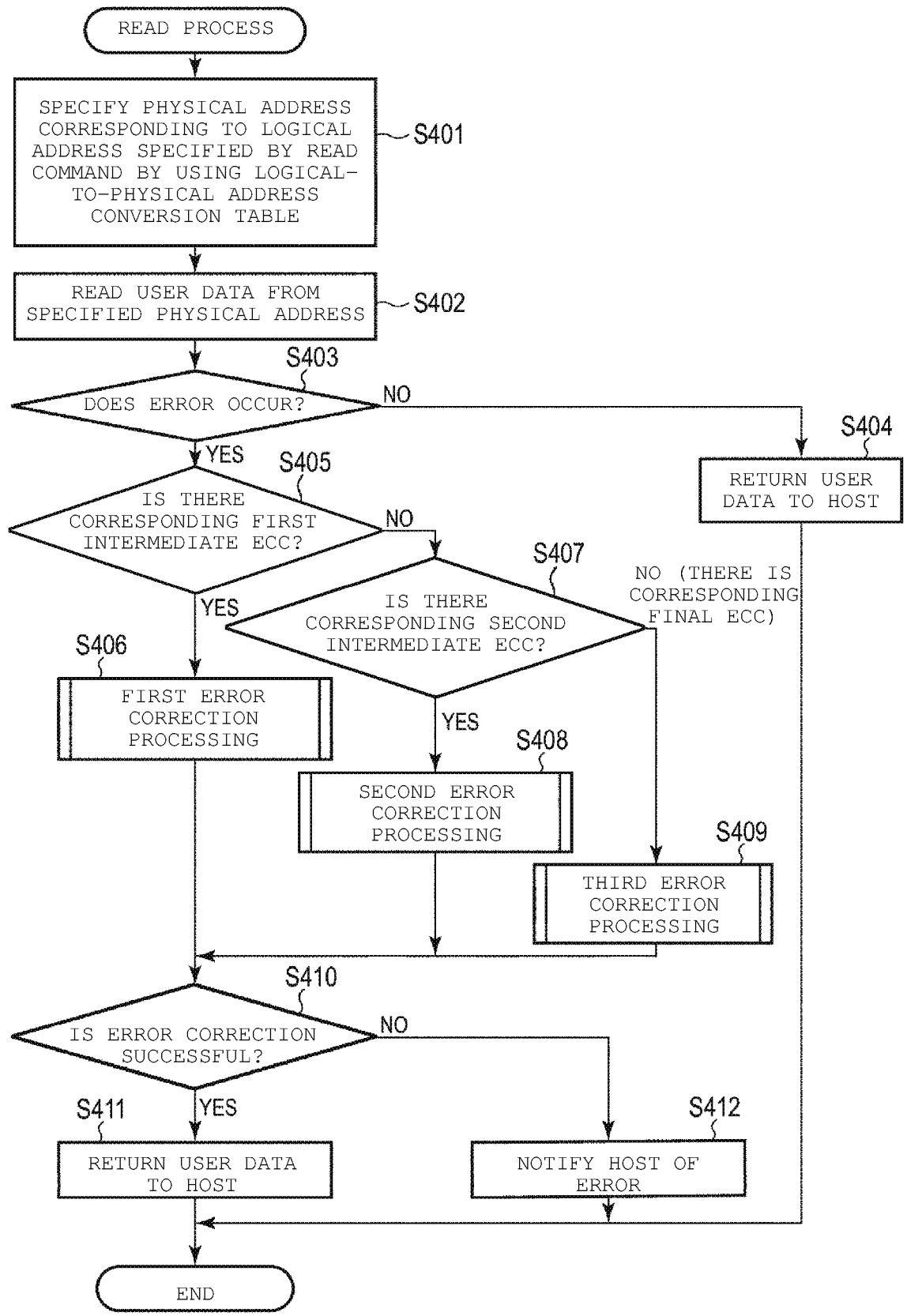
FIG. 29 is a flowchart of a read process executed by a read control unit and an error correction processing unit in a controller in a memory system according to an embodiment.

FIG. 29 is a flowchart showing an example of the procedure of read processing executed by the read control unit 121 and the error correction processing unit 124 in the controller 4 in the memory system 3 according to the embodiment. In this example, the read processing is performed according to the reception of a read command from the host 2, but the same read processing can be performed in an internal operation of the memory system 3 (for example, GC operation, refresh operation, wear leveling operation).

The read control unit 121 uses the logical-to-physical address conversion table 31 to specify the physical address corresponding to the logical address specified by the received read command (S401). The read control unit 121 reads user data from the specified physical address in the non-volatile memory 5 (S402).

The read control unit 121 determines whether an error occurs in the read user data (S403). Hereinafter, the read user data is also referred to as read data. The read control unit 121 can detect an error generated in the read data by using the in-page ECC provided in the read data. In some cases, the read data may be user data of a first protection unit or may be a part thereof. If no error occurs in the read data (S403, NO), the read control unit 121 returns (transfers) the read data to the host 2 (S404) and ends the read processing (end).

When an error occurs in the read data (S403, YES), the error correction processing unit 124 determines whether a first intermediate ECC corresponding to the read data is stored in the RAM 6 (S405). Specifically, the error correction processing unit 124 searches the data address-intermediate ECC address correspondence table 32 for an entry indicating a storage area in the RAM 6 corresponding to the physical address (that is, the data address) of the read data. Then, if the entry indicating a storage area in the RAM 6 corresponding to the physical address of the read data is in the data address-intermediate ECC address correspondence table 32, the error correction processing unit 124 determines that the first intermediate ECC corresponding to the read data is presently stored in the RAM 6. On the other hand, when there is no entry indicating a storage area in the RAM 6 corresponding to the physical address of the read data in the data address-intermediate ECC address correspondence table 32, the error correction processing unit 124 determines that first intermediate ECC corresponding to the read data is not presently stored in the RAM 6.

When the first intermediate ECC is stored in the RAM 6 (S405, YES), the error correction processing unit 124 executes the first error correction processing (S406), and proceeds to the procedure of S410. In the first error correction processing, the first intermediate ECC is used to perform error correction in the ECC frame including the user data (read data) in which the error occurs. The procedure of the first error correction processing will be described later with reference to the flowchart of FIG. 30.

When the first intermediate ECC is not stored in the RAM 6 (S405, NO), the error correction processing unit 124 next determines whether a second intermediate ECC corresponding to the read data is stored in the non-volatile memory 5 (more specifically, a save block) (S407). Specifically, the error correction processing unit 124 searches the data address-intermediate ECC address correspondence table 32 for an entry indicating a physical address in the non-volatile memory 5 corresponding to the physical address of the read data.

When the second intermediate ECC corresponding to the read data is stored in the non-volatile memory 5 (S407, YES), the error correction processing unit 124 executes the second error correction processing (S408) and proceeds to the procedure of S410. In the second error correction processing, the second intermediate ECC is used to perform error correction in the ECC frame including the user data (read data) in which the error occurs. The procedure of the second error correction processing will be described later with reference to the flowchart of FIG. 31.

When the second intermediate ECC corresponding to the read data is not stored in the non-volatile memory 5 (S407, NO), the error correction processing unit 124 executes the third error correction processing (S409) and proceeds to the procedure of S410. If the intermediate ECC corresponding to the read data is not stored in the RAM 6 or the non-volatile memory 5, the error correction processing unit 124 determines that a final ECC corresponding to the read data is stored in the non-volatile memory 5. In the third error correction processing, the final ECC is used to perform error correction in the ECC frame of the second frame size including the user data in which the error occurs. The procedure of the third error correction processing will be described later with reference to the flowchart of FIG. 32.

Next, the read control unit 121 determines whether the error correction by the procedure of S406, S408 or S409 was successful (S410). If the error correction was successful (S410, YES), the read control unit 121 returns the error-corrected user data to the host 2 (S411) and ends the read processing (end). When the error correction fails (S410, NO), the read control unit 121 notifies the host 2 of the error (S412) and ends the read processing (end). The read control unit 121 does not have to notify the host 2 of the error correction failure of the read data read in an internal operation.

By the read processing shown in FIG. 29 above, the read control unit 121 and the error correction processing unit 124 can return the user data corresponding to the read command to the host 2, or can notify the host 2 that an error occurs in the processing according to a read command. If an error occurs in the read user data, the error correction processing unit 124 can execute the error correction processing for correcting the error. If an error occurs in the data read during the GC process, the error correction processing unit 124 can similarly execute the error correction processing for correcting the error in the read data.

Figure 30:
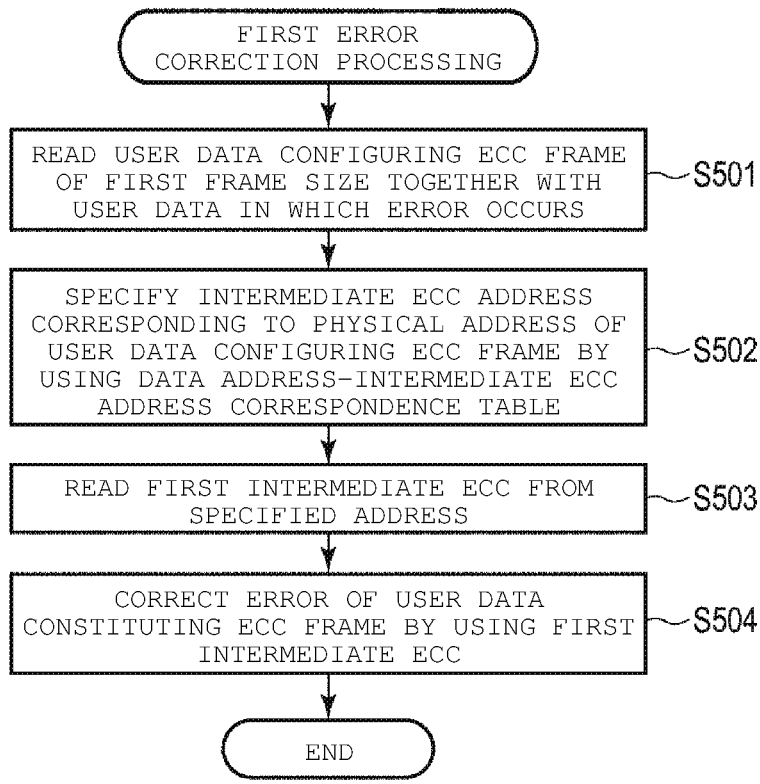
FIG. 30 is a flowchart of a first error correction processing executed by an error correction processing unit in a controller in a memory system according to an embodiment.

FIG. 30 is a flowchart showing an example of the procedure of the first error correction processing executed by the error correction processing unit 124 in the controller 4 in the memory system 3 according to the embodiment. The first error correction processing is a process executed when an error occurs in the read user data and the first intermediate ECC corresponding to the read user data is stored in the RAM 6. That is, the read user data is protected by the first intermediate ECC.

The error correction processing unit 124 reads the user data configuring the ECC frame of the first frame size together with the user data in which the error occurs from the non-volatile memory 5 (S501). The error correction processing unit 124 identifies the address of the intermediate ECC corresponding to the physical address of the user data configuring the ECC frame of the first frame size by using the data address-intermediate ECC address correspondence table 32 (S502). The specified address indicates the storage area in the RAM 6 in which the first intermediate ECC is stored.

Next, the error correction processing unit 124 reads the first intermediate ECC from the specified address (S503). That is, the error correction processing unit 124 reads the first intermediate ECC from the RAM 6 based on the address. Then, the error correction processing unit 124 uses the first intermediate ECC to perform error correction of the user data configuring the first size ECC frame (S504).

By the first error correction processing shown in FIG. 30 above, the error correction processing unit 124 can correct the error of the user data by using the first intermediate ECC.

Figure 31:
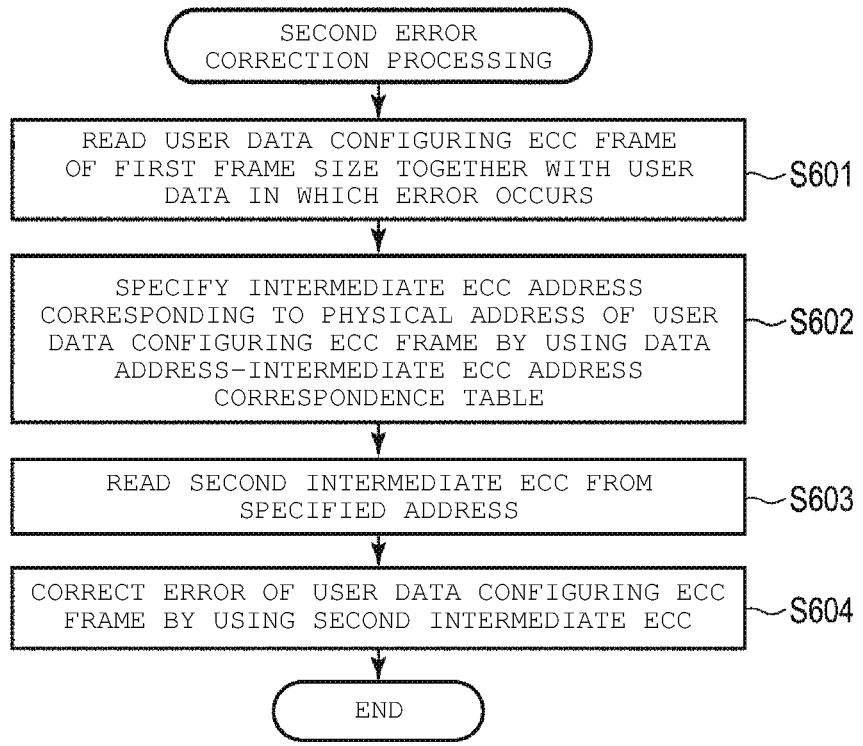
FIG. 31 is a flowchart of a second error correction processing executed by an error correction processing unit in a controller in a memory system according to an embodiment.

FIG. 31 is a flowchart showing an example of the procedure of the second error correction processing executed by the error correction processing unit 124 in the controller 4 in the memory system 3 according to the embodiment. The second error correction processing is a process executed when an error occurs in the read user data and the second intermediate ECC corresponding to the read user data is stored in the non-volatile memory 5. That is, the read user data is protected by the second intermediate ECC.

The error correction processing unit 124 reads the user data configuring the ECC frame of the first frame size together with the user data in which the error occurs from the non-volatile memory 5 (S601). The error correction processing unit 124 uses the data address-intermediate ECC address correspondence table 32 to specify the address of the intermediate ECC corresponding to the physical address of the user data configuring the ECC frame of the first frame size (S602). The specified address indicates the physical address in the non-volatile memory 5 at which the second intermediate ECC is stored.

Next, the error correction processing unit 124 reads the second intermediate ECC from the address (S603). That is, the error correction processing unit 124 reads the second intermediate ECC from the non-volatile memory 5 based on the address. Then, the error correction processing unit 124 uses the read second intermediate ECC to perform error correction of the user data configuring the first size ECC frame (S604).

By the second error correction processing shown in FIG. 31 above, the error correction processing unit 124 can correct the error of the user data by using the second intermediate ECC.

Figure 32:
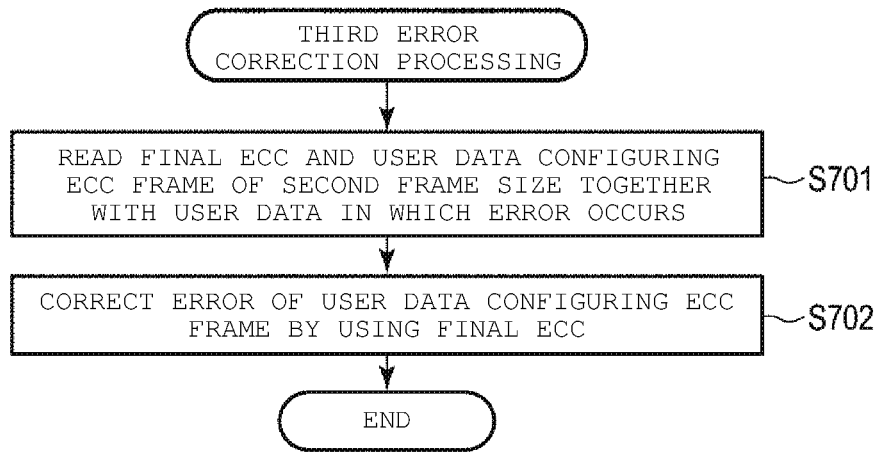
FIG. 32 is a flowchart of a third error correction processing executed by an error correction processing unit in a controller in a memory system according to an embodiment.

FIG. 32 is a flowchart showing an example of the procedure of the third error correction processing executed by the error correction processing unit 124 in the controller 4 in the memory system 3 according to the embodiment. The third error correction processing is a process executed when an error occurs in the read user data and a final ECC corresponding to the read user data is stored in the non-volatile memory 5. That is, the read user data is protected by the final ECC.

The error correction processing unit 124 reads the user data configuring the ECC frame of the second frame size and the final ECC from the non-volatile memory 5 (S701). The error correction processing unit 124 uses the final ECC to perform error correction of the user data (S702) and ends the third error correction processing (end).

By the third error correction processing shown in FIG. 32 above, the error correction processing unit 124 can correct the error of the user data by using the final ECC.

Next, the process for correcting an error in the read user data when the error occurs in the user data read from a save block will be described.

Figure 33:
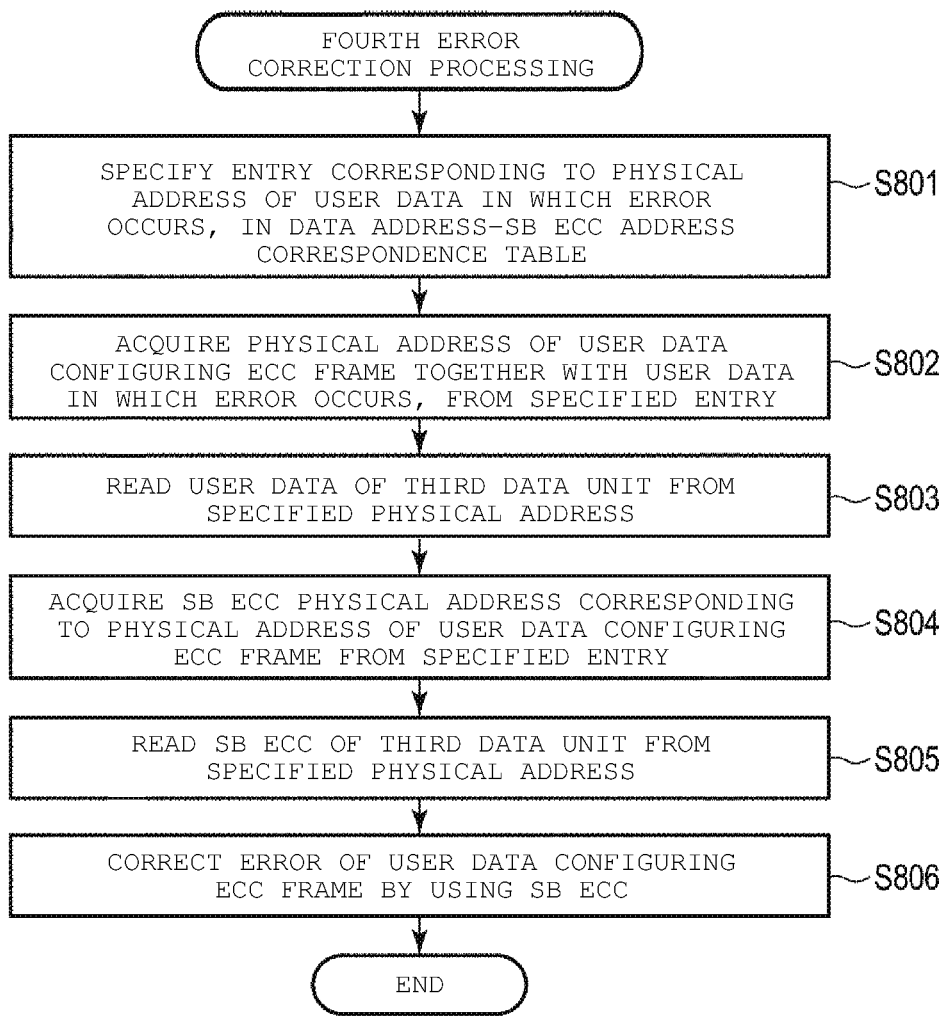
FIG. 33 is a flowchart of a fourth error correction processing executed by an error correction processing unit in a controller in a memory system according to an embodiment.

FIG. 33 is a flowchart showing an example of the procedure of the fourth error correction processing executed by the error correction processing unit 124 in the controller 4 in the memory system 3 according to the embodiment. The fourth error correction processing is a process executed when an error occurs in the user data read from a save block and the SB ECC corresponding to the user data is stored in a save block. That is, the read user data is protected by a SB ECC.

The error correction processing unit 124 identifies an entry corresponding to the physical address of the user data in which the error occurs in the data address-SB ECC address correspondence table 33 (S801). The error correction processing unit 124 acquires the physical address of the user data configuring the ECC frame together with the user data in which the error occurs from the specified entry (S802). The error correction processing unit 124 reads the user data of the third data unit size (for example, a cluster unit) from the physical address (S803). The acquired user data may have a plurality of physical addresses. When the acquired user data has a plurality of physical addresses, the error correction processing unit 124 reads the user data of the third data unit size from each of the acquired physical addresses.

Next, the error correction processing unit 124 acquires the SB ECC physical address corresponding to the physical address of the user data configuring the ECC frame from the specified entry (S804). The error correction processing unit 124 reads the SB ECC from the acquired physical address (S805). The acquired SB ECC may have a plurality of physical addresses. When the acquired SB ECC has a plurality of physical addresses, the error correction processing unit 124 reads the SB ECC of the third data unit size from each of the acquired physical addresses.

Then, the error correction processing unit 124 corrects the error of the user data configuring the ECC frame by using the read SB ECC (S806).

By the fourth error correction processing shown in FIG. 33 above, the error correction processing unit 124 can correct the error of the user data read from the save block by using the SB ECC.

As described above, according to the present embodiment, it is possible to reduce the ratio of ECC in the data stored in the non-volatile memory.

The controller 4 encodes data of the first unit size to be written into the non-volatile memory 5 and generates the first intermediate ECC of a first size configuring a first ECC frame together with the data of the first unit size. The controller 4 writes the data of the first unit size into the non-volatile memory 5. The controller 4 stores the first intermediate ECC in the RAM 6. When the controller 4 is required to make an intermediate ECC that protects the data of the first unit size non-volatile, the controller 4 encodes the data of the first unit size to generate a second intermediate ECC of a second size (less than the first size) configuring the second ECC frame together with the data of the first unit size, and writes the second intermediate ECC into the non-volatile memory 5.

By writing the second intermediate ECC into the non-volatile memory 5, the amount of ECC data written into the non-volatile memory 5 can be reduced as compared with the case where the first intermediate ECC is directly written into the non-volatile memory 5. Therefore, the ratio of ECC in the data stored in the non-volatile memory 5 can be reduced.

Each of the various functions described in this embodiment may be implemented by a circuit (processing circuit). Examples of processing circuits include programmed processors such as a central processing unit (CPU). This processor executes each of the described functions by executing a computer program (command group) stored in the memory. This processor may be a microprocessor including an electronic circuit. Examples of processing circuits also include a digital signal processor (DSP), an application specific integrated circuit (ASIC), a microcontroller, a controller, and other electrical circuit components. Each of the components other than the CPU described in this embodiment may also be implemented by the processing circuit.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system, comprising:
a non-volatile memory;
a volatile memory; and
a controller configured to control the non-volatile memory and the volatile memory, wherein
the controller is configured to:
encode a first unit size data portion of data to be written into the non-volatile memory to generate a first error correction code corresponding to a first error correction code frame with the first unit size data portion,
write the first unit size data portion into the non-volatile memory,
store the first error correction code in the volatile memory, and
encode the first unit size data portion to generate a second error correction code corresponding to a second error correction code frame with the first unit size data portion, and then write the second error correction code into the non-volatile memory when the non-volatilization of an error correction code corresponding to the first unit size data portion is requested, and
the second error correction code is smaller in size than the first error correction code.

2. The memory system according to claim 1, wherein
the first error correction code includes a total of α symbols, where α is an integer of 2 or more,
the second error correction code includes a total of β symbols, where β is an integer of 2 or more, and
the β symbols are smaller than the α symbols in size.

3. The memory system according to claim 2, wherein the controller is configured to write data portion sizes corresponding to the β symbols in parallel into the non-volatile memory.

4. The memory system according to claim 1, wherein the controller is further configured to:
read the first unit size data portion from the non-volatile memory when the non-volatilization of the error correction code corresponding to the first unit size data portion is requested, and
generate the second error correction code when no error occurs in the reading of the first unit size data portion or an error that occurs in the reading of the first unit size data portion that can be remedied by the first size error correction code.

5. The memory system according to claim 4, wherein the controller is further configured to:
perform error correction processing on the first unit size data portion using the first error correction code when an error occurs in the reading of the first unit size data portion, and
encode a corrected first unit size data portion to generate the second error correction code.

6. The memory system according to claim 1, wherein the controller is further configured to:
write the second error correction code into the non-volatile memory in a first mode in which n-bit data is written per memory cell, where n is an integer of 1 or more, and
write the first unit size data portion into the non-volatile memory in a second mode in which m-bit data is written per memory cell, where m is an integer greater than n.

7. The memory system according to claim 1, wherein
the non-volatile memory includes a plurality of blocks,
each of the plurality of blocks includes a storage area for data of a second unit size,
when the volatile memory stores second data to be written into the non-volatile memory, and the non-volatilization of the second data is requested, the controller is configured to:
divide the second data into a total of b data portions of a third unit size that is smaller than the second unit size, and
encode one or more of the b data portions to generate a third error correction code corresponding to a third error correction code frame with the one or more b data portions, the third error correction code corresponding to the one of more b data portions and having the third unit size,
write each of the b data portions into a total of b blocks among the plurality of blocks, and
write a total of c third error correction codes corresponding to the b data portions into c blocks among the plurality of blocks, the c blocks being different blocks than the b blocks in the plurality of blocks.

8. The memory system according to claim 7, wherein
the second unit size is a page unit in size, and
the third unit size is a cluster unit in size.

9. The memory system according to claim 1, wherein
the controller is configured to:
encode a total of (d−1) data portions each of the first unit size in the volatile memory along with a third data portion of less than the first unit size in the volatile memory to generate a fourth error correction code corresponding to a fourth error correction code frame with the (d−1) data portions and the third data portion, and
write each of the (d−1) data portions in separate blocks of the non-volatile memory and the third data portion along with the fourth error correction code into another separate block of the non-volatile memory from the (d−1) data portions, and
d is an integer of 2 or greater.

10. A control method for a memory system, the method comprising:
encoding a first unit size portion of data to be written into a non-volatile memory to generate a first error correction code corresponding to a first error correction code frame with the first unit size portion;
writing the first unit size portion into the non-volatile memory;
storing the first error correction code in a volatile memory; and
encoding the first unit size portion to generate a second error correction code corresponding to a second error correction code frame with the first unit size portion, and then write the second error correction code into the non-volatile memory when the non-volatilization of an error correction code corresponding to the first unit size portion is requested, wherein the second error correction code is smaller in size than the first error correction code.

11. The control method according to claim 10, wherein the first error correction code includes a total of α symbols, where α is an integer of 2 or more, the second error correction code includes a total of β symbols, where β is an integer of 2 or more, and the β symbols are smaller than the α symbols in size.

12. The control method according to claim 10, further comprising:
reading the first unit size data portion from the non-volatile memory when the non-volatilization of the error correction code corresponding to the first unit size portion is requested; and
generating the second error correction code when no error occurs in the reading of the first unit size portion or an error that occurs in the reading of the first unit size portion that can be remedied by the first size error correction code.

13. The control method according to claim 12, further comprising:
performing error correction processing on the first unit size portion using the first error correction code when an error occurs in the reading of the first unit size portion; and
encoding a corrected first unit size portion to generate the second error correction code.

14. The control method according to claim 10, further comprising:
writing the second error correction code into the non-volatile memory in a first mode in which n-bit data is written per memory cell, where n is an integer of 1 or more; and
writing the first unit size portion into the non-volatile memory in a second mode in which m-bit data is written per memory cell, where m is an integer greater than n.

15. The control method according to claim 10, wherein each of the plurality of blocks includes a storage area for data of a second unit size, and the method further comprising:
dividing second data stored in the volatile memory into a total of b data portions of a third unit size that is smaller than the second unit size,
encoding one or more of the b data portions to generate a third error correction code corresponding to a third error correction code frame with the one or more b data portions, the third error correction code corresponding to the one of more b data portions and having the third unit size,
writing each of the b data portions into a total of b blocks among the plurality of blocks, and
writing a total of c third error correction codes corresponding to the b data portions into c blocks among the plurality of blocks, the c blocks being different blocks than the b blocks in the plurality of blocks.

16. The control method according to claim 15, wherein the second unit size is a page unit in size, and the third unit size is a cluster unit in size.

17. The control method according to claim 10, further comprising:
encoding a total of (d−1) data portions, each of the first unit size, from the volatile memory along with a third data portion of less than the first unit size from the volatile memory to generate a fourth error correction code corresponding to a fourth error correction code frame with the (d−1) data portions and the third data portion; and
writing each of the (d−1) data portions in separate blocks of the non-volatile memory and the third data portion along with the fourth error correction code into another separate block of the non-volatile memory from the (d−1) data portions, wherein
d is an integer of 2 or greater.

18. A memory controller, comprising:
a processor configured to:
encode a first unit size data portion to be written into a non-volatile memory to generate a first error correction code corresponding to a first error correction code frame with the first unit size data portion,
write the first unit size data portion into the non-volatile memory,
store the first error correction code in a volatile memory, and
encode the first unit size data portion to generate a second error correction code corresponding to a second error correction code frame with the first unit size data portion, and then write the second error correction code into the non-volatile memory when the non-volatilization of an error correction code corresponding to the first unit size data portion is requested, and
the second error correction code is smaller in size than the first error correction code.

19. The memory controller according to claim 18, further comprising:
an error correction encoder, wherein the processor uses the error correction encoder to encode the first unit size data portion.

20. The memory controller according to claim 18, further comprising:
a first memory interface connectable to the non-volatile memory; and
a second memory interface connectable to the volatile memory.

* * * * *